United States Patent
Tanaka et al.

(10) Patent No.: US 7,426,222 B2
(45) Date of Patent: Sep. 16, 2008

(54) LASER APPARATUS

(75) Inventors: Tomiji Tanaka, Saitama (JP); Kageyasu Sako, Tokyo (JP); Ryo Kasegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 11/425,005

(22) Filed: Jun. 19, 2006

(65) Prior Publication Data

US 2006/0285125 A1 Dec. 21, 2006

(30) Foreign Application Priority Data

Jun. 21, 2005 (JP) ............................ P2005-181035
Dec. 22, 2005 (JP) ............................ P2005-369029

(51) Int. Cl.
*H01S 5/0683* (2006.01)
*H01S 5/14* (2006.01)

(52) U.S. Cl. .............................. 372/20; 372/19; 372/32

(58) Field of Classification Search .................. 372/19, 372/20, 32, 38.01
See application file for complete search history.

(56) References Cited

U.S. PATENT DOCUMENTS

2002/0122444 A1* 9/2002 Tsai ............................ 372/18
2003/0108071 A1* 6/2003 Hedin et al. .................. 372/32

* cited by examiner

*Primary Examiner*—Minsun Harvey
*Assistant Examiner*—Michael Carter
(74) *Attorney, Agent, or Firm*—Sonnenschein Nath & Rosenthal LLP

(57) ABSTRACT

A laser apparatus is disclosed. An optical element receives at least a part of laser light emitted from a laser generation source and generates interference fringes. Each of first and second two-divided detectors has two detectors arranged in the direction of which the interference fringes appear. Each of the detectors detects an amount of light of the interference fringes. These two-divided detectors are spaced apart for an odd-number multiple of nearly ¼ period of interference fringes and disposed on a plane perpendicular to an optical path of the interference fringes. Each of first and second calculation sections calculates a first difference signal of detection signals of two detectors of the two-divided detector. A selection section selects one of the first and second difference signals. A determination section determines a wavelength of the laser light corresponding to a value of the difference signal selected from the first and second difference signals.

26 Claims, 36 Drawing Sheets

LASER APPARATUS

CROSS REFERENCES TO RELATED APPLICATIONS

The present invention contains subject matter related to Japanese Patent Application No.JP 2005-181035 filed on Jun. 21, 2005, and Japanese Patent Application No.JP 2005-369029 filed on Dec. 22, 2005, the entire contents of which being incorporated herein by reference.

BACKGROUND OF THE INVENTION

1. Field of the Invention

The present invention relates to a laser apparatus having a structure of an external cavity type semiconductor laser, in particular, to the laser apparatus which is capable of detecting the variation of a wavelength of laser light emitted therefrom.

2. Description of the Related Art

In recent years, since a laser apparatus has many features such as small size and low power consumption, the laser apparatus has been widely used for many information devices. For example, a single mode laser is used for a holographic data storage (HDS). In the HDS, one laser beam is split into two beams by a beam splitter and then the split beams are combined again on a record medium. Using interference of the two beams, data are recorded.

As a light source with which data are hologram recorded and reproduced, a gas laser or a second harmonic generation (SHG) laser is mainly used as a single mode light source. However, when a semiconductor laser such as a laser diode (LD) which generates multi mode laser light is combined with an external resonator, the laser can generate single mode laser light. As a result, this laser can be used as a light source with which data are hologram recorded and reproduced.

Next, with reference to FIG. 1, the structure of a Littrow type laser apparatus which contains a typical external cavity type semiconductor laser will be described. FIG. 1 is a plane view showing the laser apparatus that is designated by reference numeral 200. The structure of the laser apparatus 200 is the same as the structure of a laser apparatus described in L. Ricci, et al., "A compact grating-stabilized diode laser system for atomicphysics", Optics Communications, 117 1995, pp 541-549.

In the laser apparatus 200, longitudinal multiple mode laser light emitted from a laser diode 201 is collimated by a collimate lens 202. The collimated light enters a reflection type diffraction grating (hereinafter referred to as the grating) 203. The grating 203 outputs first order diffracted light of the incident light. A first order diffracted light having a predetermined wavelength corresponding to an arrangement angle of the grating 203 is inversely injected into the laser diode 201 through the collimate lens 202. As a result, the laser diode 201 resonates with the injected first order diffracted light and emits single mode light (zero-th order light designated by arrow F). The wavelength of the emitted light is the same as the wavelength of the light that returns from the grating 203.

The grating 203 is held by a support portion 204. The support portion 204 has a groove 206. By rotating a screw 205 disposed on the support portion 204, the gap of the groove 206 is partly widened or narrowed. As a result, the horizontal arrangement angle of the grating 203 slightly varies. The reflection angle of the first order light reflected by the grating 203 depends on the wavelength of the laser light emitted from the laser diode 201. By adjusting the angle of the grating 203 for first order light having a desired wavelength that returns to the laser diode 201, laser light having the desired wavelength can be generated.

A similar mechanism is disposed so as to adjust the vertical angle of the grating 203. The support portion 204 which holds the grating 203 is held by a support portion 207. The support portion 207 has a groove (not shown). By rotating a screw 208 disposed on the support portion 207, the gap of the groove is partly widened or narrowed. Thus, the vertical arrangement angle of the grating 203 is slightly varied.

In this case, the laser diode 201 is for example a blue laser diode. In addition, the external cavity type semiconductor laser having the foregoing structure can be used for applications such as a holography memory writer which uses single mode laser light.

Next, with reference to a graph shown in FIG. 2, the relationship between laser power and wavelength of laser light which is output from the external cavity type semiconductor laser apparatus described in FIG. 1 will be described. The horizontal axis of the graph shown in FIG. 2 denotes the laser power of the laser light in mW, whereas the vertical axis of the graph denotes the wavelength of the laser light in nm. As is clear from FIG. 2, as the laser power of the laser light increases, the wavelength thereof varies nearly in a saw tooth wave shape.

The external cavity type semiconductor laser apparatus has an external cavity mode hop region and an inner semiconductor laser chip mode hop region. In the external cavity mode hop region, as the laser power increases, the wavelength of the laser light that is emitted gradually increases. In the inner semiconductor laser chip mode hop region, as the laser power increases, the wavelength of the laser light that is emitted sharply decreases. As the laser power of the laser light increases, the wavelength thereof discretely varies to some extent.

When the laser power is around 30 mW, the external cavity type semiconductor laser apparatus emits laser light having a single wavelength, namely perfectly single mode laser light. However, when the laser power of the laser apparatus is around 32 mW, it emits laser light having three wavelengths, namely three-mode laser light. When the laser power of the laser apparatus is around 35 mW in the inner semiconductor laser chip mode hop region, the laser apparatus emits laser light having six wavelengths, namely six-mode laser light— three modes at a wavelength of around 409.75 nm and three modes at a wavelength of around 409.715 nm.

FIG. 3A, FIG. 3B, FIG. 3C, and FIG. 3D show several spectra of laser light. As was described above, in the external cavity mode hop region of which the wavelength of laser light gradually increases, spectra as shown in FIG. 3A, FIG. 3B, and FIG. 3C occur. On the other hand, in the inner semiconductor laser chip mode hop region where the laser power is around 35 mW, a spectrum as shown in FIG. 3D occurs.

When these types of laser light are used for the HDS, the three-mode laser light (as shown in FIG. 3A) and the two-mode laser light (as shown in FIG. 3B) which are generated with a laser power of 32 mW indicate the same record and reproduction characteristics as the perfect single-mode laser light (a spectrum light in FIG. 3c). Thus, these types of laser light can be used as single-mode laser light. In this case, the perfect signal mode laser light that occurs with a laser power of around 30 mW and the three-mode laser light and the two-mode laser light that occur with a laser power of around 32 mW are together referred to as usable mode laser light.

On the other hand, in the six mode state which occurs with a laser power of around 35 mW as shown in FIG. 3D, since two three-mode regions are spaced apart by around 40 pm, it is difficult to hologram record data. In this case, such six-mode laser light is referred to as unusable mode laser light.

The region in which usable mode laser light is obtained nearly corresponds to the external cavity mode hop region. The region in which unusable mode laser light is obtained nearly corresponds to the inner semiconductor laser chip mode hop region. As is clear from the graph shown in FIG. 2, the region in which usable mode laser light is obtained is much wider than the region in which unusable mode laser light is obtained. Thus, when the unusable mode laser light can be effectively removed, it is quite possible to use the external cavity type semiconductor laser for the HDS.

In addition, characteristics of laser power and wavelength of laser light shown in FIG. 2 depend on the inner temperature of the external cavity type semiconductor laser. When the temperature of the semiconductor laser is not constant, the value of the laser power with which unusable mode laser light occurs varies. Thus, in related art, the inner temperature of the external cavity type semiconductor laser is almost kept constant so that the region in which unusable mode laser light is generated does not vary. In addition, the laser power in the region is not used.

However, according to the method of the related art, to prevent the external cavity type semiconductor laser from emitting the unusable mode laser light, it is necessary to control the laser power thereof while keeping the inner temperature thereof almost constant. Thus, the structure and control of the laser apparatus become complicated.

Although the laser power of the external cavity type semiconductor laser may be controlled with a detected result of the wavelength of laser light, the wavelength detecting device of related art is very large and expensive. Thus, this method is not suitable for applications such as the HDS.

To solve such a problem, the applicant of the present patent application proposed an apparatus and method that has a simple structure and that is capable of detecting the variation of a wavelength for 0.04 nm of laser light emitted from an external cavity type semiconductor laser. Specifically, the applicant proposed to detect the wavelength of laser light emitted from an external cavity type semiconductor laser with an optical wedge.

In the proposed wavelength detecting device, a two-divided detector is disposed on an optical path of light reflected on the front surface and rear surface of the optical wedge. Reflected light of the optical wedge causes interference fringes to occur. The brightness of the interference fringes varies in a sine shape. The phases of the interference fringes move with the wavelength of the laser light. When the interference fringes are received by the two-divided detector, the variation of the wavelength can be detected.

SUMMARY OF THE INVENTION

As shown in FIG. 4, when the position at which the amount of light having a desired wavelength is the maximum (or minimum) matches the position at which two detectors Pa and Pb of the two-divided detector PD is divided (hereinafter, this position is simply referred to as the center of the two-divided detector), the variation of the wavelength can be easily detected. When a difference signal (A-B of detection signals A and B of the detectors Pa and Pb of the two-divided detector PD is generated, due to the relationship of the positions shown in FIG. 4, the difference signal becomes 0. When the interference fringes move rightward on the drawing, the difference signal becomes plus (+). When the interference fringes move leftward, the difference signal becomes minus (−)

FIG. 5 shows measured values of measured results of the wavelength that varies in the case that the laser power is deliberately swept from 0 to 50 mW and thereby a mode hop occurs. The measured results shown in FIG. 5 correspond to those shown in FIG. 2. Thus, it is clear that the variation of the wavelength can be detected.

On the other hand, when the center of the two-divided detector PD is positioned at around (maximum value+minimum value)/2 of interference fringes, as denoted with measured results shown in FIG. 6, it is difficult to correctly detect the variation of the wavelength. As the wavelength increases, the difference signal may increase or decrease. Thus, it is difficult to handle the difference signal. In addition, near the boundary of the center of the two-divided detector, even if the wavelength varies, the level of the difference signal does not largely vary.

When the wavelength of laser light generated by the laser is constant, the maximum value or minimum value of the interference fringes that occur with the wavelength can be aligned with the center of the two-divided detector. However, when a tunable laser is used, since the wavelength is varied for several nm, for example 6 nm, even if the two-divided detector is optimally set for a position of a particular wavelength, it may not be said that the position is optimum for other wavelengths.

In view of the foregoing, it would be desirable to provide a laser apparatus that allows a wavelength that varies to be properly detected like a tunable laser when a two-divided detector detects that interference fringes move with the wavelength.

According to an embodiment of the present invention, there is provided a laser apparatus that has an optical element, a first two-divided detector, a second two-divided detector, a first calculation section, a second calculation section, a selection section, and a determination section. The optical element receives at least a part of laser light emitted from a laser generation source and generates interference fringes. The first two-divided detector has two detectors arranged in the direction of which the interference fringes appear, each of the detectors detecting an amount of light of the interference fringes. The second two-divided detector has two detectors arranged in the direction of which the interference fringes appear. Each of the detectors detects an amount of light of the interference fringes. The second two-divided detector is spaced apart from the first two-divided detector for an odd-number multiple of nearly ¼ period of the interference fringes. The second two-divided detector and the first two-divided detector are disposed on a plane perpendicular to an optical path of light of the interference fringes. The first calculation section calculates a first difference signal of detection signals of the two detectors of the first two-divided detector. The second calculation section calculates a second difference signal of detection signals of the two detectors of the second two-divided detector. The selection section selects one of the first difference signal and the second difference signal. The determination section detects a discontinuous variation of a level of one difference signal selected from the first difference signal and the second difference signal.

According to an embodiment of the present invention, there is provided a laser apparatus. The laser apparatus has a diffraction grating, an optical element, a first two-divided detector, a second two-divided detector, a first calculation section, a second calculation section, a selection section, and a determination section. The diffraction grating receives laser light from a semiconductor laser, emits first order diffracted light having a predetermined wavelength to the semiconductor laser, and reflects zero-th order light as output light. The optical element receives at least a part of the output light of the diffraction grating and generates interference fringes. The first two-divided detector has two detectors arranged in the direction of which the interference fringes appear. Each of the detectors detects an amount of light of the interference fringes. The second two-divided detector has two detectors arranged in the direction of which the interference fringes appear. Each of the detectors detects an amount of light of the interference fringes. The second two-divided detector is spaced apart from the first two-divided detector for an odd-number multiple of nearly ¼ period of the interference fringes. The second two-divided detector and the first two-divided detector are disposed on a plane perpendicular to an optical path of light of the interference fringes. The first calculation section calculates a first difference signal of detection signals of the two detectors of the first two-divided detector. The second calculation section calculates a second difference signal of detection signals of the two detectors of the second two-divided detector. The selection section selects one of the first difference signal and the second difference signal. The determination section detects a discontinuous variation of a level of one difference signal selected from the first difference signal and the second difference signal.

According to an embodiment of the present invention, there is provided a laser apparatus. The laser apparatus has a diffraction grating, a mirror, a support section, an optical element, a first two-divided detector, a second two-divided detector, a first calculation section, a second calculation section, a selection section, and a determination section. The diffraction grating receives laser light from a semiconductor laser, emits first order diffracted light having a predetermined wavelength to the semiconductor laser, and reflects zero-th order light. The mirror reflects the zero-th order light reflected by the diffraction grating. The support section supports the diffraction grating and the mirror while an open angle of the diffraction grating and the mirror is kept constant and rotatably supports the diffraction grating and the mirror with a fulcrum which is an intersection of an extended line of a front surface of the diffraction grating and an extended line of a front surface of the mirror. The optical element receives at least a part of laser light from the diffraction grating and generates interference fringes. The first two-divided detector has two detectors arranged in the direction of which the interference fringes appear. Each of the detectors detects an amount of light of the interference fringes. The second two-divided detector has two detectors arranged in the direction of which the interference fringes appear. Each of the detectors detects an amount of light of the interference fringes. The second two-divided detector is spaced apart from the first two-divided detector for an odd-number multiple of nearly ¼ period of the interference fringes. The second two-divided detector and the first two-divided detector are disposed on a plane perpendicular to an optical path of light of the interference fringes. The first calculation section calculates a first difference signal of detection signals of the two detectors of the first two-divided detector. The second calculation section calculates a second difference signal of detection signals of the two detectors of the second two-divided detector. The selection section selects one of the first difference signal and the second difference signal. The determination section detects a discontinuous variation of a level of one difference signal selected from the first difference signal and the second difference signal.

According to an embodiment of the present invention, there is provided a laser apparatus. The laser apparatus has an optical element, a first detector pair, a second detector pair, a first calculation section, a second calculation section, a selection section, and a determination section. The optical element receives at least a part of laser light from a laser generation source and generates interference fringes. The first detector pair has a first detector and a second detector successively arranged with a first distance along the interference fringes. The second detector pair has the second detector and a third detector successively arranged with a second distance along the interference fringes. The first calculation section calculates a first difference signal of a detection signal of the first detector and a detection signal of the second detector. The second calculation section calculates a second difference signal of a detection signal of the second detector and a detection signal of the third detector. The selection section selects one of the first difference signal and the second difference signal. The determination section detects a discontinuous variation of a level of one difference signal selected from the first difference signal and the second difference signal. The first distance and the second distance on a plane perpendicular to an optical path of light of the interference fringes against one period $2\pi$ are nearly $(2\pi/3, \pi/3)$ or nearly $(2\pi/3, 2\pi/3)$.

According to an embodiment of the present invention, there is provided a laser apparatus. The laser apparatus has a diffraction grating, an optical element, a first detector pair, a second detector pair, a first calculation section, a second calculation section, a selection section, and a determination section. The diffraction grating receives laser light from a semiconductor laser, diffracts first order diffracted light having a predetermined wavelength to the semiconductor laser, and reflects zero-th order light as output light. The optical element receives at least a part of the output light of the diffraction grating and generates interference fringes. The first detector pair has a first detector and a second detector successively arranged with a first distance along the interference fringes. The second detector pair has the second detector and a third detector successively arranged with a second distance along the interference fringes. The first calculation section calculates a first difference signal of a detection signal of the first detector and a detection signal of the second detector. The second calculation section calculates a second difference signal of a detection signal of the second detector and a detection signal of the third detector. The selection section selects one of the first difference signal and the second difference signal. The determination section detects a discontinuous variation of a level of one difference signal selected from the first difference signal and the second difference signal. The first distance and the second distance on a plane perpendicular to an optical path of light of the interference fringes against one period $2\pi$ are nearly $(2\pi/3, \pi/3)$ or nearly $(2\pi/3, 2\pi/3)$.

According to an embodiment of the present invention, there is provided a laser apparatus. The laser apparatus has a diffraction grating, a mirror, a support section, an optical element, a first detector pair, a second detector pair, a first calculation section, a second calculation section, a selection section, and a determination section. The diffraction grating receives laser light from a semiconductor laser, diffracts first order diffracted light having a predetermined wavelength to the semiconductor laser, and reflects zero-th order light. The mirror reflects the zero-th order light reflected by the diffraction grating. The support section supports the diffraction grating and the mirror while an open angle of the diffraction grating and the mirror is kept constant and rotatably supports the diffraction grating and the mirror with a fulcrum which is an intersection of an extended line of a front surface of the diffraction grating and an extended line of a front surface of the mirror. The optical element receives at least a part of laser light from the diffraction grating and generates interference fringes. The first detector pair has a first detector and a second detector successively arranged with a first distance along the interference fringes. The second detector pair has the second detector and a third detector successively arranged with a second distance along the interference fringes. The first calculation section calculates a first difference signal of a detection signal of the first detector and a detection signal of the second detector. The second calculation section calculates a second difference signal of a detection signal of the second detector and a detection signal of the third detector. The selection section selects one of the first difference signal and the second difference signal. The determination section detects a discontinuous variation of a level of one difference signal selected from the first difference signal and the second difference signal. The first distance and the second distance on a plane perpendicular to an optical path of light of the interference fringes against one period $2\pi$ are nearly ($2\pi/3$, $\pi/3$) or nearly ($2\pi/3$, $2\pi/3$).

According to an embodiment of the present invention, two sets of two-divided detectors or three detectors are disposed. A wavelength is detected with a detection signal that denotes a correct wavelength is selected from a plurality of detection signals. Thus, even if the wavelength varies like a tunable laser, the change of the wavelength due to a mode hop can be securely detected.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

An embodiment of the present invention is an apparatus that uses an optical wedge to detect a wavelength of laser light emitted from an external cavity type semiconductor laser.

First of all, the optical wedge which is an example of an optical device that generates interference fringes will be described. The optical wedge is a glass plate having a wedge shape section formed by two planes at an angle of several ten minutes. When laser light having a single wavelength enters the front surface of the optical wedge at an angle of around 45 degrees to the front surface of the optical wedge, light reflected on the front surface of the glass plate and light reflected on the rear surface thereof form interference fringes. In other words, when the phases of the two reflected rays of light are the same, a bright pattern appears. In contrast, when the phases of the two reflected rays of light are opposite, a dirk pattern appears. Since a phase difference varies with the thickness of the optical wedge, a bright and dirk fringe pattern image appears in the direction of which the thickness of the optical wedge varies (this image is referred to as interference fringes). In addition, when the wavelength of the laser light varies, the positions of bright and dirk fringes vary.

Figure 1:
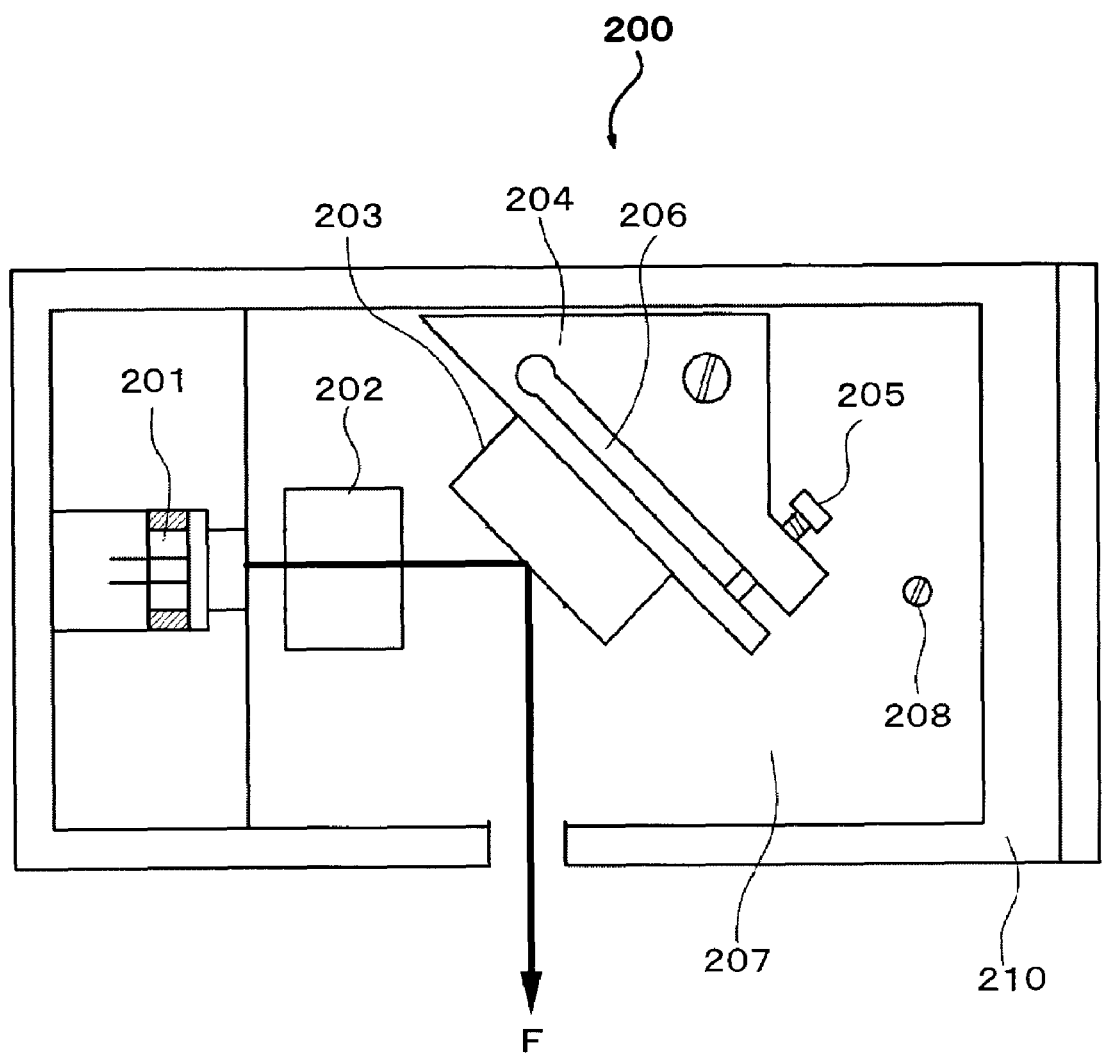
FIG. 1 is a schematic diagram showing a structure of a Littrow type external cavity type semiconductor laser.
Figure 2:
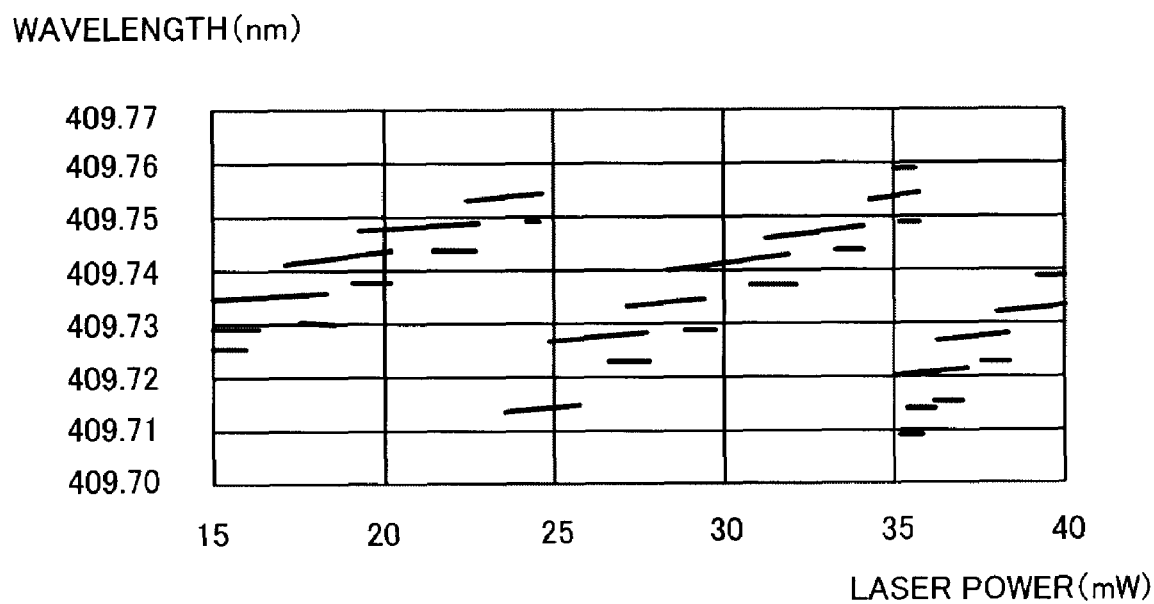
FIG. 2 is a graph showing the relationship of the wavelength and laser power of laser light emitted from the external cavity type semiconductor laser.
Figure 3A:
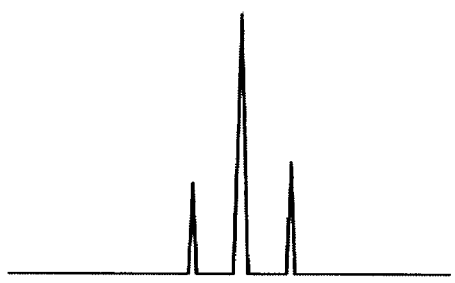
FIG. 3A, FIG. 3B, FIG. 3C, and FIG. 3D are schematic diagrams showing mode patterns of laser light emitted from the external cavity type semiconductor laser.
Figure 3B:
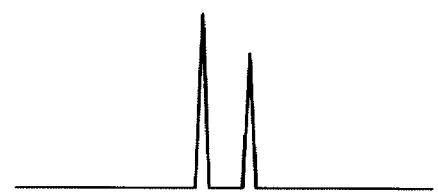
Figure 3C:
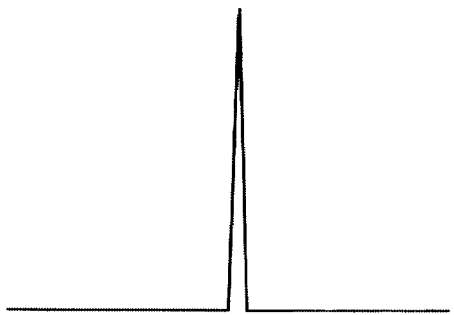
Figure 3D:
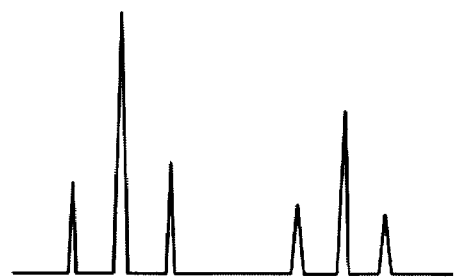
Figure 4:
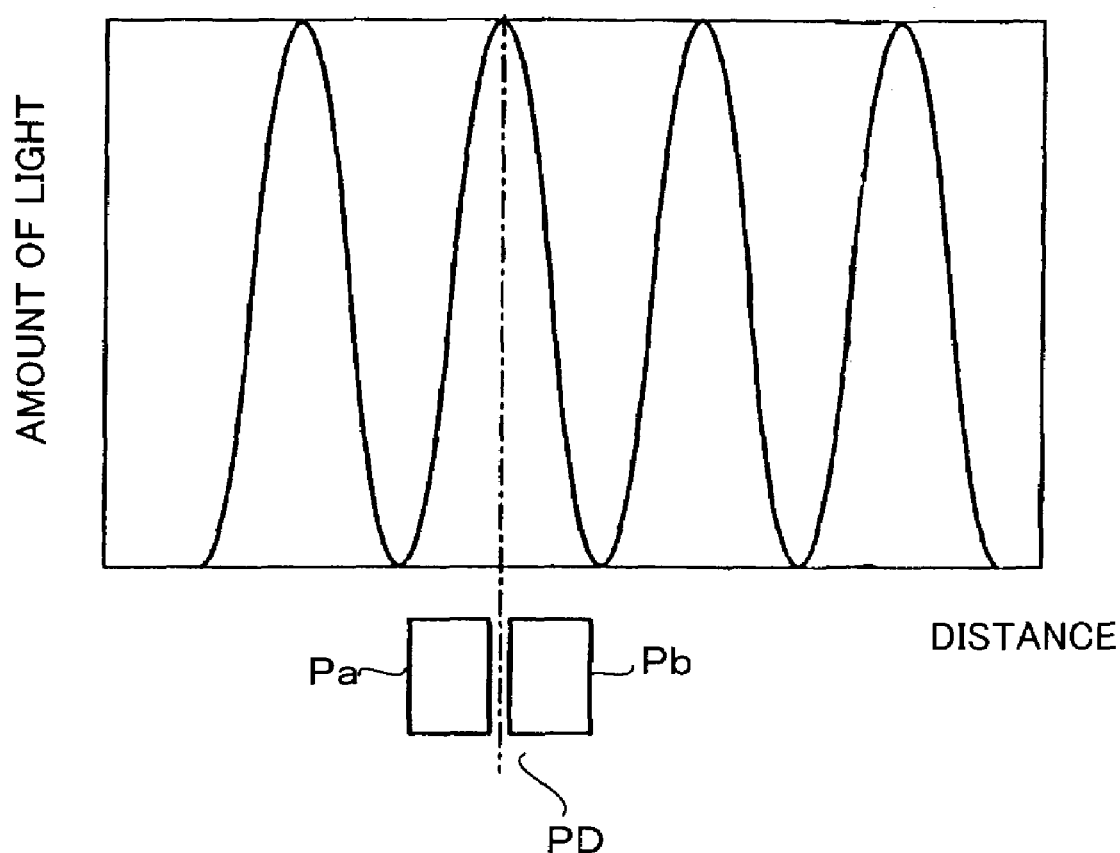
FIG. 4 is a schematic diagram showing an example of the relationship of interference fringes by an optical wedge and the position of a two-divided detector.
Figure 5:
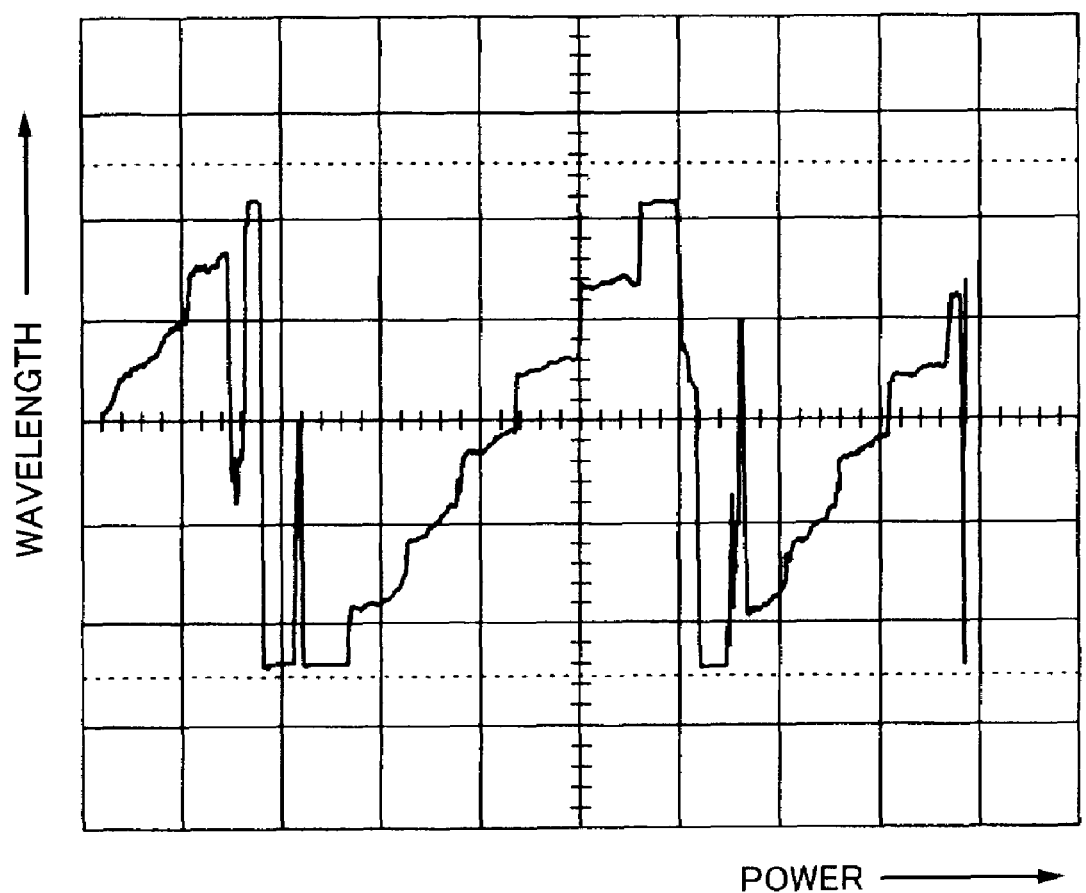
FIG. 5 is a graph showing a measured result of the variation of the wavelength detected by the two-divided detector.
Figure 6:
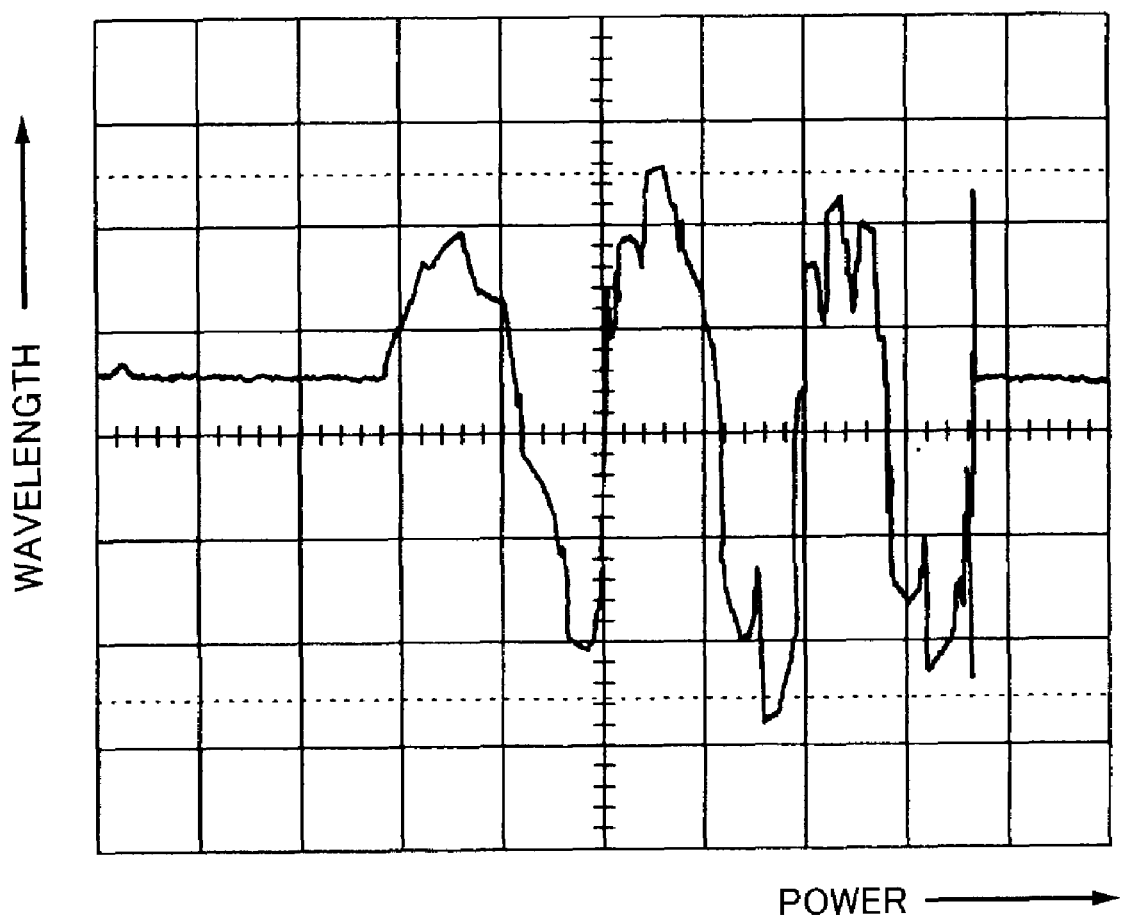
FIG. 6 is a graph showing a measured result of the variation of the wavelength detected by the two-divided detector.
Figure 7:
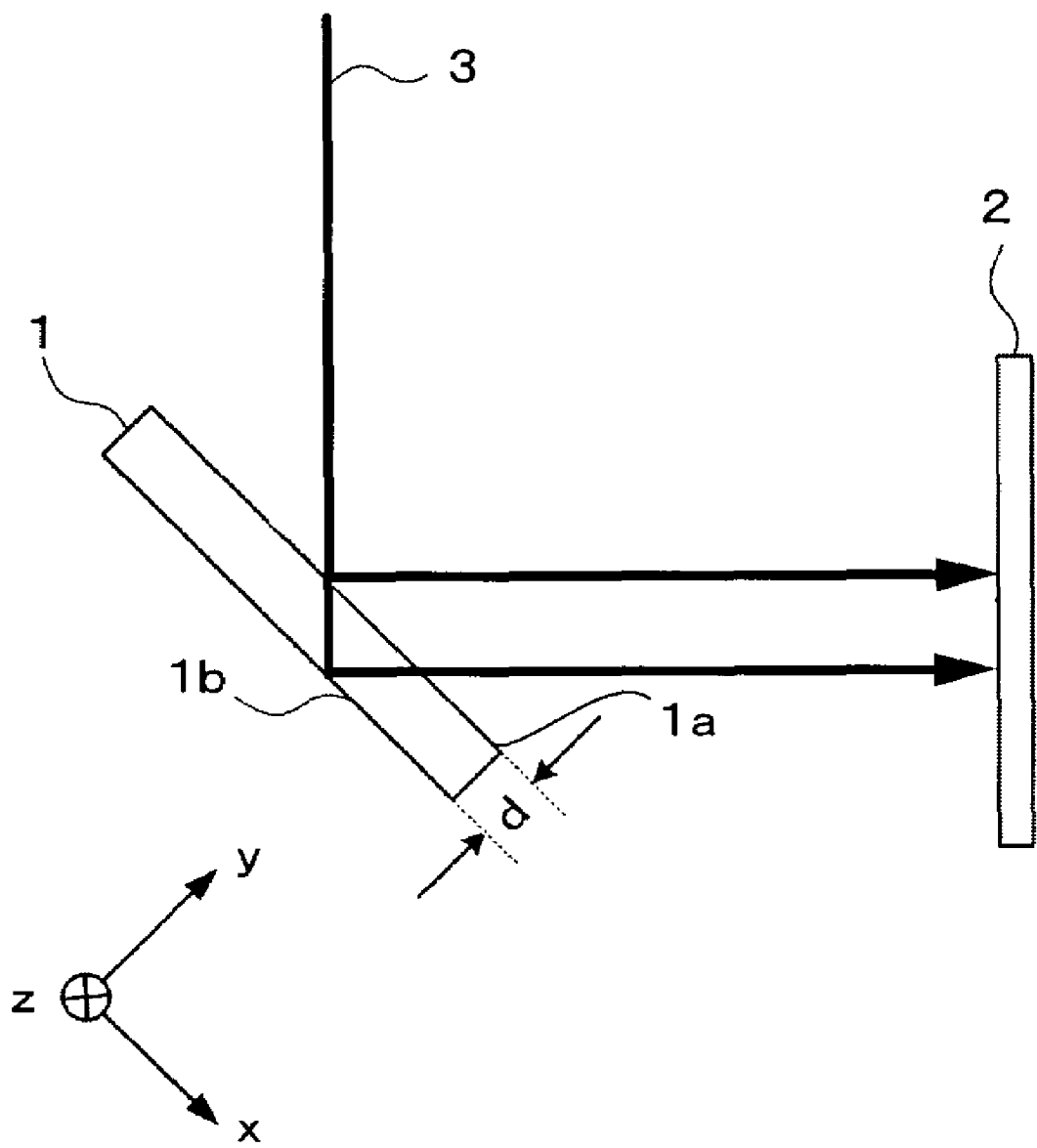
FIG. 7 is a schematic diagram describing the operation of the optical wedge.

FIG. 7 shows the state of which laser light 3 enters an optical wedge 1. The laser light 3 is reflected by the optical wedge 1 and enters a frosted glass 2. The optical wedge 1 is tapered in the direction of the z axis shown in FIG. 7, namely the thickness d of the optical wedge 1 decreases in the direction of the z axis. The direction of the z axis extends from the foreside of the drawing of FIG. 7 to the far side thereof. The direction of the x axis is in parallel with a front surface 1a and a rear surface 1b of the optical wedge 1 and perpendicular to the y axis. The direction of the y axis is perpendicular to both the x axis and the z axis.

Figure 8:
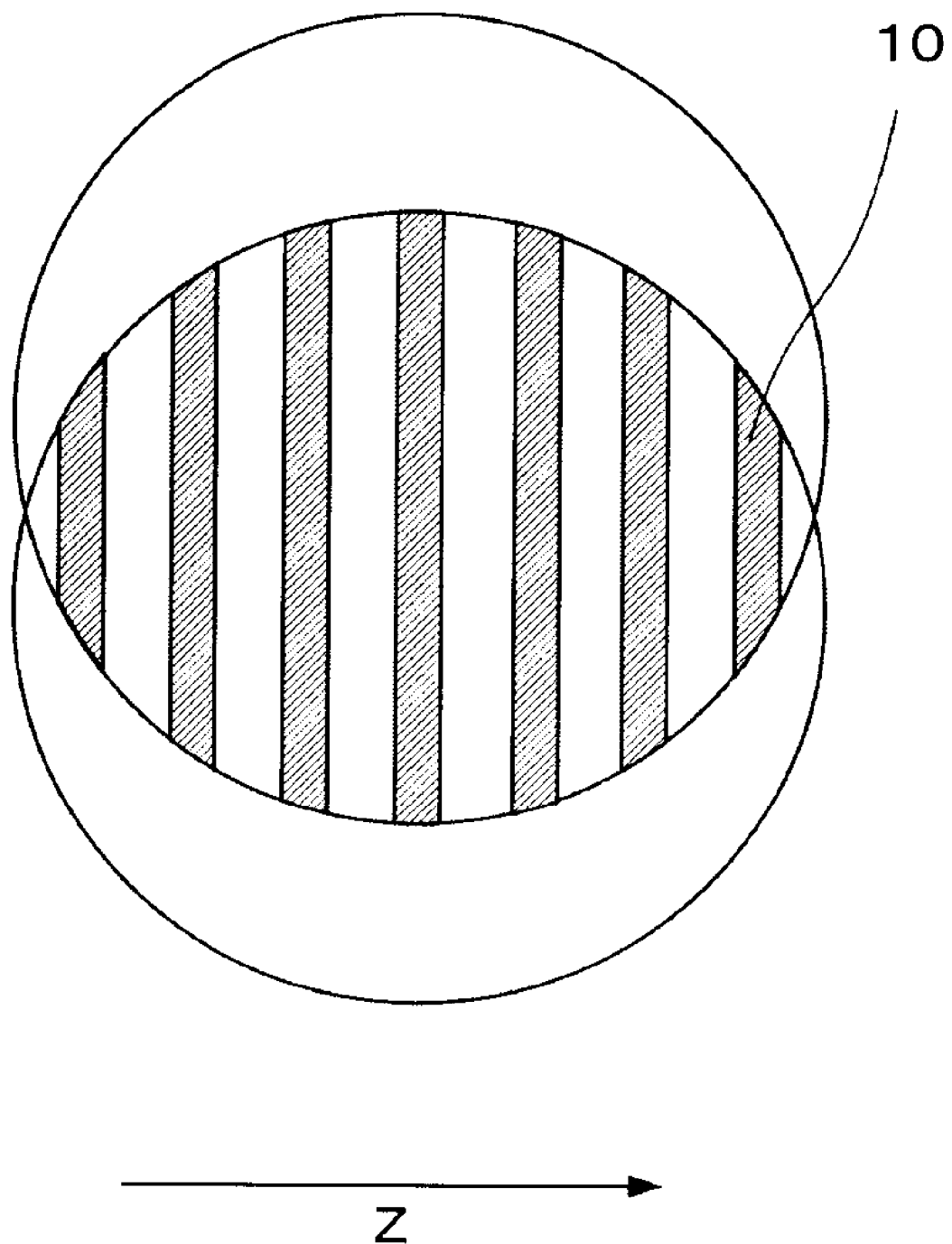
FIG. 8 is a schematic diagram showing interference fringes that occur by laser light reflected on the optical wedge.

The laser light 3 is reflected on the front surface 1a of the optical wedge 1 and then enters the frosted glass 2. In addition, the laser light 3 is reflected on the rear surface 1b of the optical wedge 1 and enters the frosted glass 2. Thus, an optical path difference occurs. As a result, interference fringes 10 as shown in FIG. 8 occur. The optical wedge 1 may be tapered in the direction of the x axis. Namely, the thickness d of the optical wedge 1 may be decreased in the direction of the x axis. In this case, the interference fringes 10 shown in FIG. 8 appear sideways.

According to an embodiment of the present invention, since it is not necessary for a user to watch the interference fringes 10 shown in FIG. 8 with his or her eyes, the frosted glass 2 is not an essential structural element of an embodiment of the present invention. According to an embodiment of the present invention, the interference fringes 10 are detected by at least two sets of two-divided detectors or at least one set of a three-divided detector.

Figure 9:
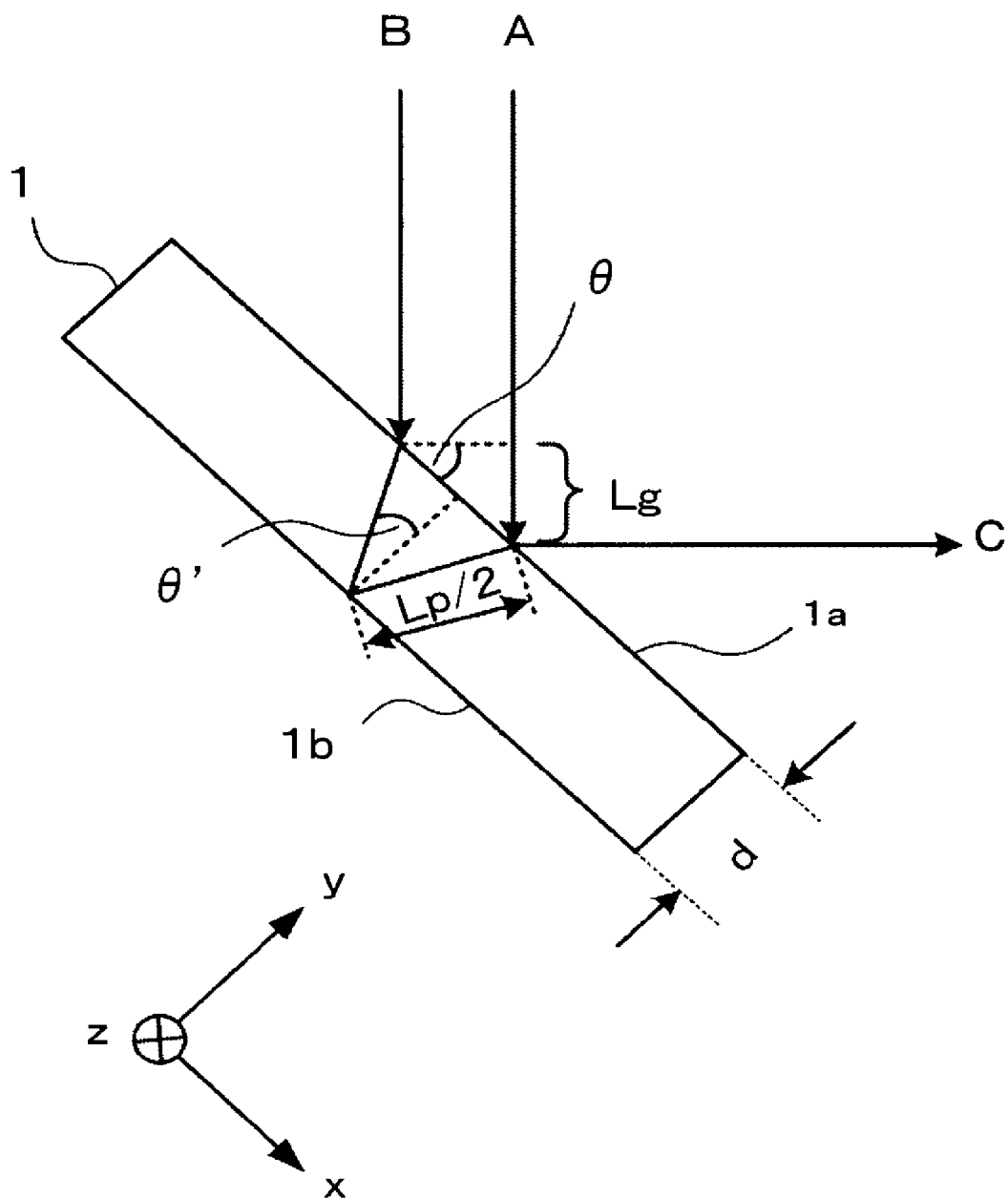
FIG. 9 is a schematic diagram used to calculate an optical path difference of the optical wedge.

Next, the optical wedge will be described in more detail. As shown in FIG. 9, it is assumed that rays A and B of one laser enter an optical wedge 1. In this case, the optical wedge 1 shown in FIG. 9 is the same as that shown in FIG. 7. Likewise, the optical wedge 1 is tapered in the direction of the z axis shown in FIG. 7, namely the thickness d of the optical wedge 1 decreases in the direction of the z axis.

The ray A is reflected on a front surface 1a of the optical wedge 1. The reflected ray is denoted by ray C. The ray B is reflected on the rear surface 1b of the optical wedge 1. This reflected ray is also denoted by ray C. In this condition, an optical path difference between the ray A and the ray B is obtained. With the optical path difference, the phase difference of the rays C is calculated. According to the Snell's law, the relationship of the following formula (1) is satisfied.

$$\sin \theta / \sin \theta' = n \quad (1)$$

On the other hand, length Lg is given by the following formula (2).

$$Lg = 2d^* \tan \theta'^* \sin \theta \quad (2)$$

In addition, length Lp for which the ray B travels in the optical wedge 1 is given by the following formula (3).

$$Lp = 2(Lp/2) = 2(d/\cos \theta') = 2d/\cos \theta' \quad (3)$$

When Lp' denotes an optical length of Lp, Lp' is given by the following formula (4).

$$Lp' = 2nd/\cos \theta' \quad (4)$$

Optical path difference ΔL of Lp' and Lg is given by the following formula (5).

$$\Delta L = Lp' - Lg = 2nd/\cos \theta' - 2d^* \tan \theta'^* \sin \theta = 2d(n/\cos \theta' - \sin \theta^* \tan \theta') \quad (5)$$

Phase difference Δδ with respect to ΔL is given by the following formula (6).

$$\Delta \delta = 2\pi \times \Delta L / \lambda + \pi \quad (6)$$

π is added due to a phase change that occurs when a ray is reflected.

In this case, optical intensity I is given by the following formula (7).

$$I = 2\{1 + \cos \Delta \delta\} \quad (7)$$

Figure 10:
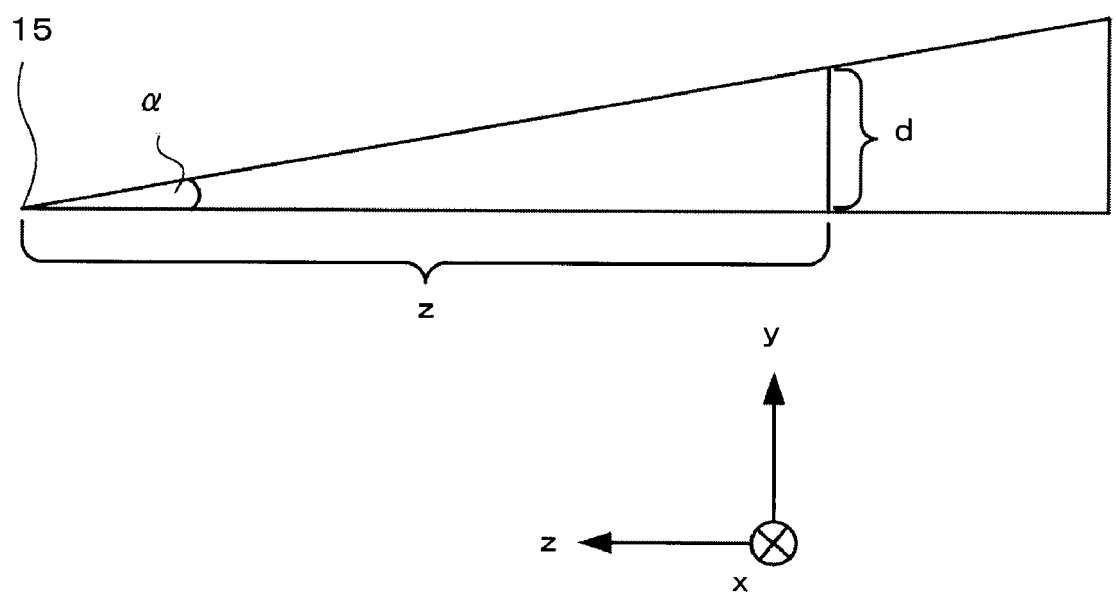
FIG. 10 is a schematic diagram showing the optical wedge viewed in the direction of the x axis.

As shown in FIG. 10, the optical wedge 1 has a wedge shape that is tapered in the direction of the x axis so that an edge portion 15 has an angle of α (hereinafter, this angle may be referred to as the wedge angle). However, the optical wedge 1 may not have the edge portion 15. Typically, the optical wedge 1 is formed in a nearly trapezoidal shape, which does not have a tapered edge portion. In addition, as shown in FIG. 10, the thickness d of the optical wedge 1 is a function of displacement z of the z axis. The thickness d of the optical wedge 1 is given by the following formula (8).

$$d = z^* \tan \alpha \quad (8)$$

where z denotes a distance from the edge portion 15 on the z axis.

Next, an experiment in interference fringes which occur with two rays reflected on the optical wedge 1 will be conducted with respect to intensities of the rays having different wavelengths. In this experiment, it is assumed that two rays having a lower limit wavelength (λ1) and an upper limit wavelength (λ2) that vary in a saw tooth wave shape which is typical in an external cavity type semiconductor laser are used. In this case, it is assumed that λ1 is 410.00 nm and λ2 is 410.04 nm and that refractive index n=1.5, incident angle θ=45 degrees, and wedge angle α of optical wedge 1=0.02 degrees.

Figure 11:
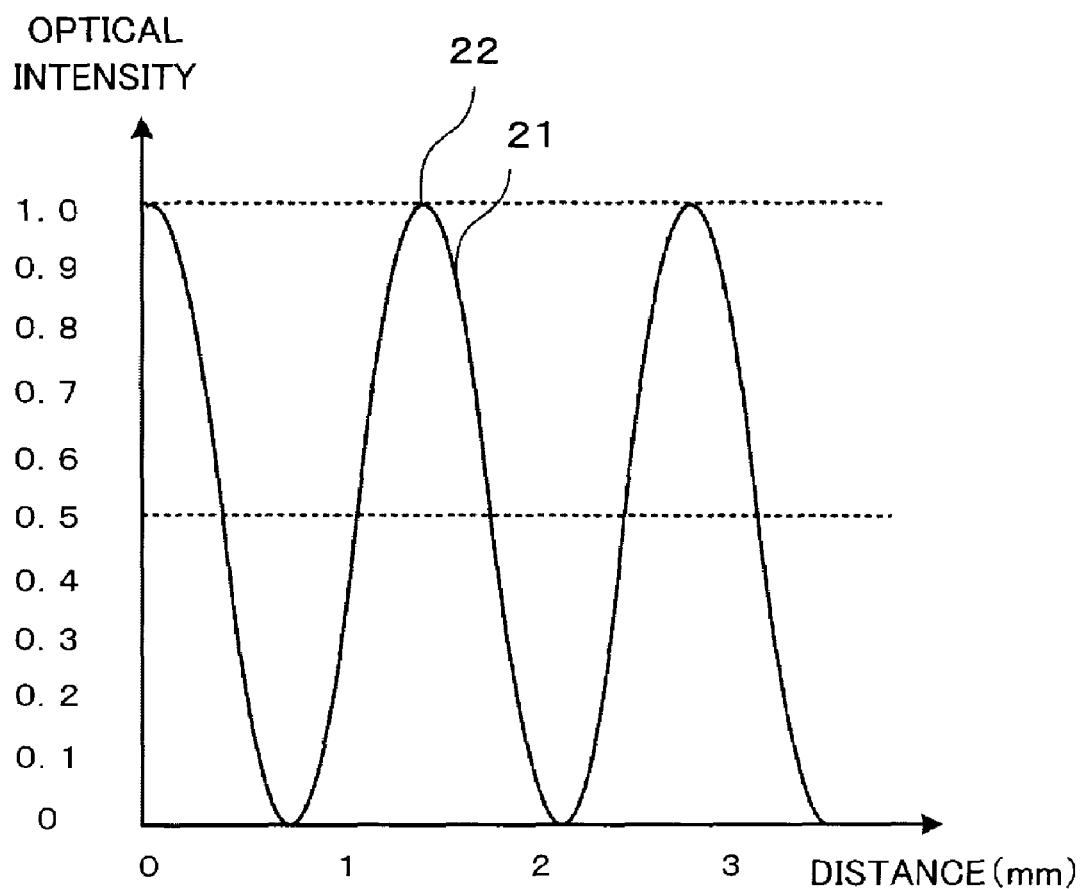
FIG. 11 is a graph showing intensities of reflected rays in the case that rays having wavelength $\lambda 1$ and wavelength $\lambda 2$ are reflected on the optical wedge.

FIG. 11 is a graph showing the relationship between the positions of the rays having wavelengths λ1 and λ2 on the optical wedge 1 and the variations of intensities of the reflected rays from the optical wedge 1. In FIG. 11, the vertical axis denotes relative optical intensities, whereas the horizontal axis denotes the distance from the edge portion 15 of the optical wedge 1, namely the distance from the edge portion 15 of the optical wedge 1 in the direction of the z axis. FIG. 11 shows the variations of intensities of reflected rays in the case that rays having wavelength λ1 and wavelength λ2 are emitted to a region for around 3 mm from the edge portion 15 of the optical wedge 1.

As was described above, the reflected rays form interference fringes of which bright stripes and dirk stripes alternately appear at large intensity positions and low intensity positions. In this case, since the two wavelengths λ1 and λ2 of the two rays are very close and these rays are emitted to a portion close to the edge portion 15 of the optical wedge 1, the optical path difference is very small. As a result, a curve 21 that denotes the intensity of the reflected ray of the ray having wavelength λ1 is nearly the same as a curve 22 that denotes the intensity of the reflected ray of the ray having wavelength λ2. As a result, interference fringes of the ray having wavelength λ1 appear to match those of the ray having wavelength λ2.

Figure 12:
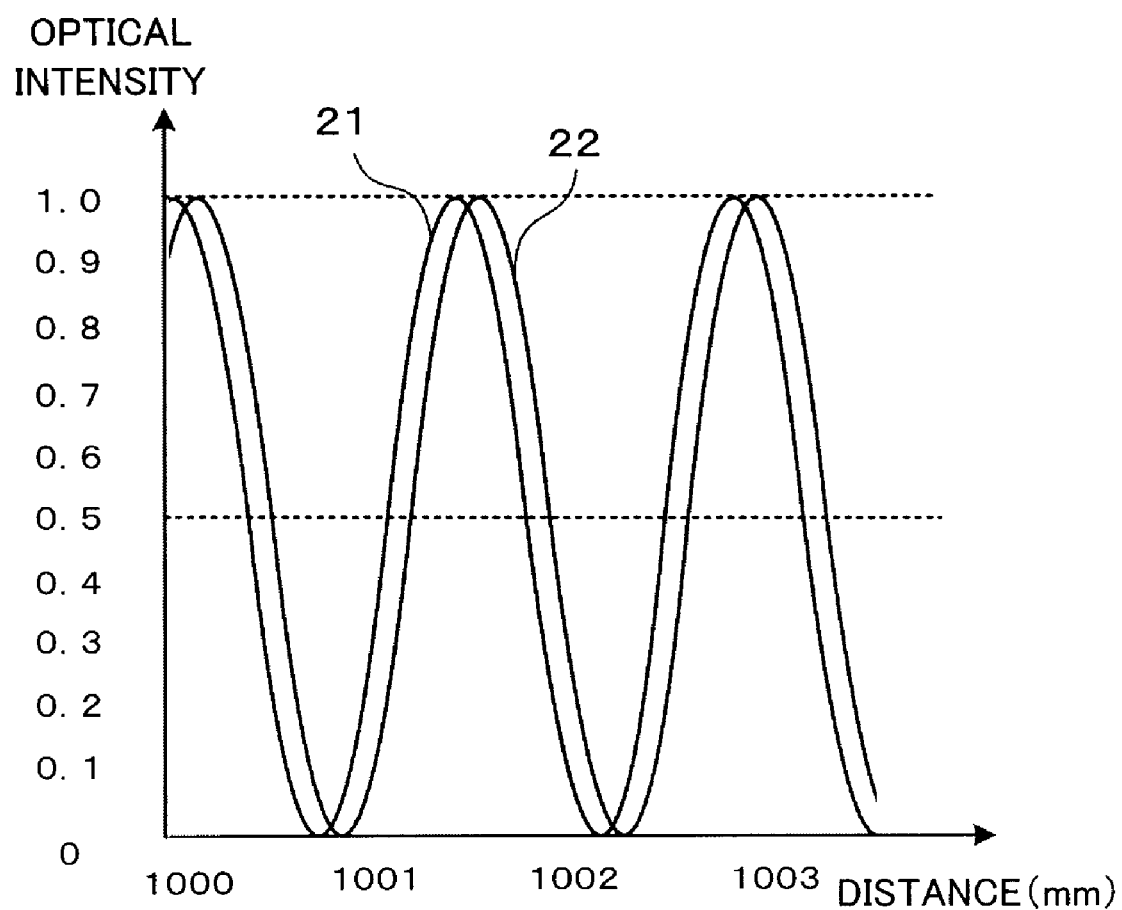
FIG. 12 is another graph showing intensities of reflected rays in the case that rays having wavelength $\lambda 1$ and wavelength $\lambda 2$ are reflected on the optical wedge.

Like FIG. 11, FIG. 12 shows the variations of the intensities of reflected rays of rays that enter the optical wedge 1. FIG. 12 shows the case that the positions of the rays that enter the optical wedge 1 are around 1000 mm (1 m) from the edge portion 15 of the optical wedge 1. The distance of around 1 m from the edge portion 15 of the optical wedge 1 does not mean that it is necessary to use an optical wedge having a length of 1 m. As was described above, since a portion apart from the edge portion 15 for around 1 m is cut in a trapezoidal shape, the size of the optical wedge can be decreased.

In this case, the thickness d of the optical wedge 1 is very large at the position of around 1 m from the edge portion 15 of the optical wedge 1. As a result, since a wavelength difference of λ1 and λ2 for 0.04 nm becomes unignorable, a small phase difference occurs between the curve 21 and the curve 22. However, since the phase difference is small, interference fringes that appear with the ray having wavelength λ1 are almost the same as those that appear with the ray having wavelength λ2.

These results were obtained from experiments of which a ray having wavelength λ1 and a ray having wavelength λ2 are emitted to predetermined positions. Now, it is assumed that rays whose wavelengths vary in a saw tooth wave shape as shown in FIG. 12 are emitted to the optical wedge 1. In addition, it is assumed that the lower limit of the wavelengths is λ1 and the upper limit thereof is λ2. In this case, the curve 21, which denotes the reflected ray of the ray having wavelength λ1, appears. Thereafter, as the laser power of the semiconductor laser is increased, the wavelength gradually varies from λ1 to λ2. As a result, the curve 21 changes to the curve 22. Thereafter, as the laser power is further increased, the state of which both the curve 21 and the curve 22 co-exist occurs. Thereafter, only the curve 21, which denotes the reflected ray of the ray having wavelength λ1, occurs. Thereafter, as the laser power is increased, the variations of interference fringes can be periodically observed.

Figure 13:
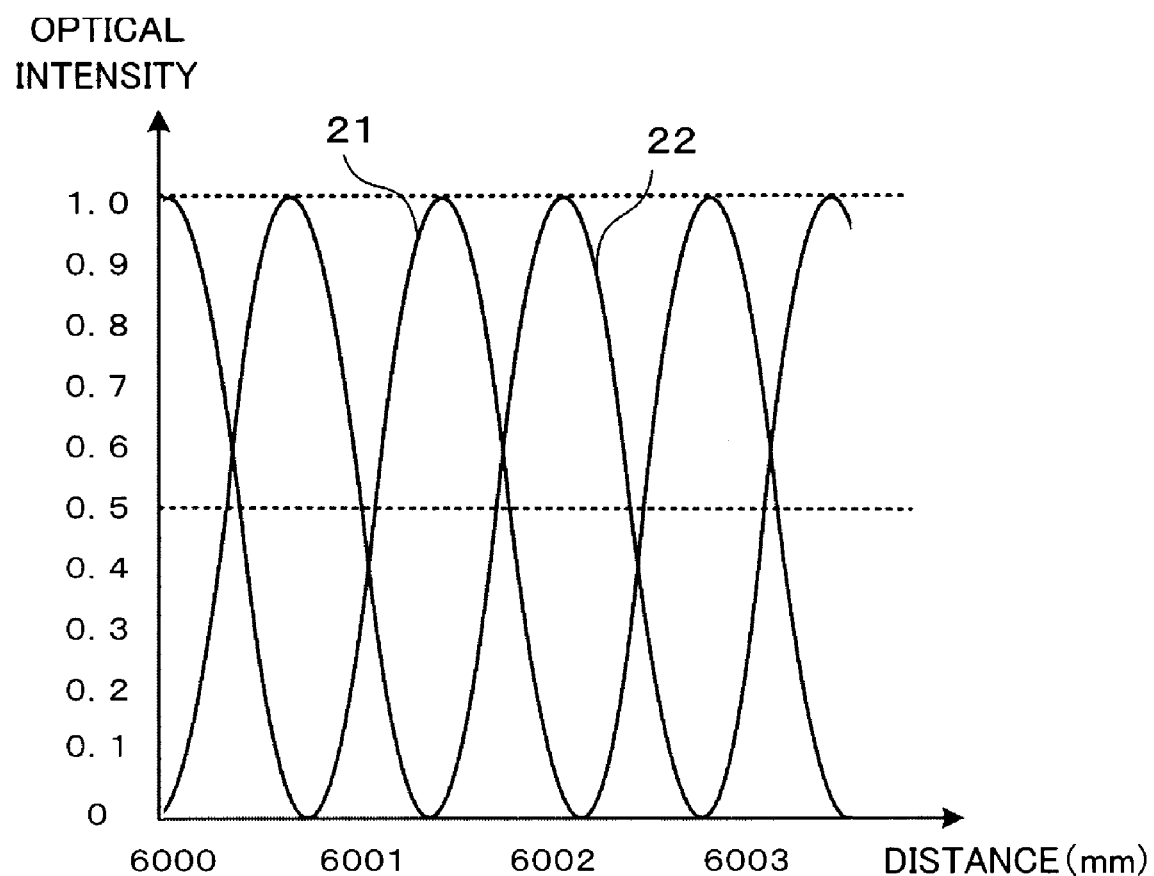
FIG. 13 is another graph showing intensities of reflected rays in the case that rays having wavelength $\lambda 1$ and wavelength $\lambda 2$ are reflected on the optical wedge.

Like FIG. 11, FIG. 13 shows the variations of optical intensities of reflected rays of rays emitted to the optical wedge 1. FIG. 13 shows the case that the positions of rays emitted to the optical wedge 1 are around 6000 mm (6 m) from the edge portion 15 of the optical wedge 1. In this case, the phase of a curve 21 that denotes the intensity of a reflected ray of a ray having wavelength λ1 is almost opposite to the phase of a curve 22 that denotes the intensity of a reflected ray of a ray having wavelength λ2. When both the rays enter the optical wedge 1, it becomes difficult to observe interference fringes.

In the state shown in FIG. 12, when the wedge angle α is changed from 0.02 degrees to 0.04 degrees, the periods of the curve 21 and the curve 22 become small. As a result, the number of stripes in the same distance becomes larger than that shown in FIG. 12. Thus, when the positions of rays emitted to the optical wedge, the wedge angle α, and so forth are adjusted, the shape of the interference fringes can be freely adjusted.

Figure 14:
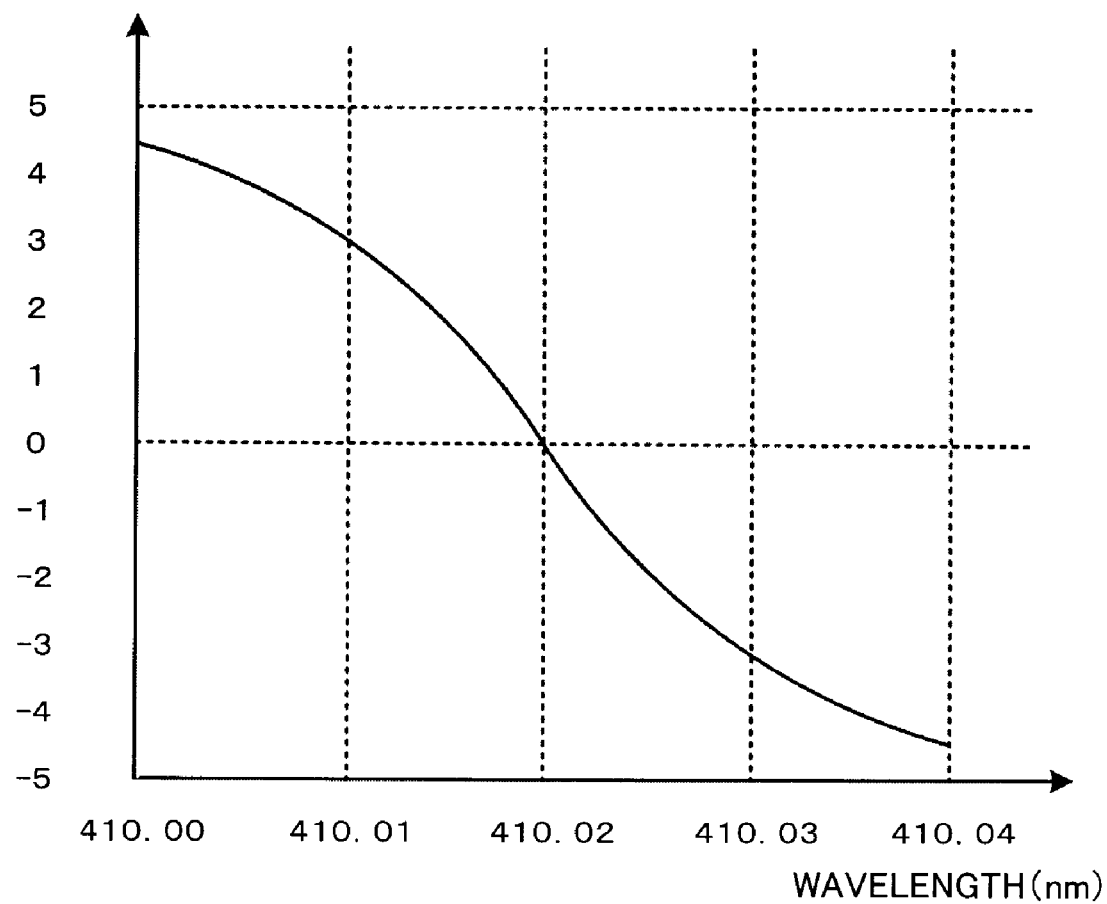
FIG. 14 is a graph showing the variations of push-pull values calculated corresponding to detected values of two detectors.

As detected results of a detector 31 and a detector 32, push-pull values as shown in FIG. 14 are obtained for individual wavelengths. Push-pull values are signals of which rays having individual wavelengths are emitted to position z of the optical wedge 1.

Figure 15:
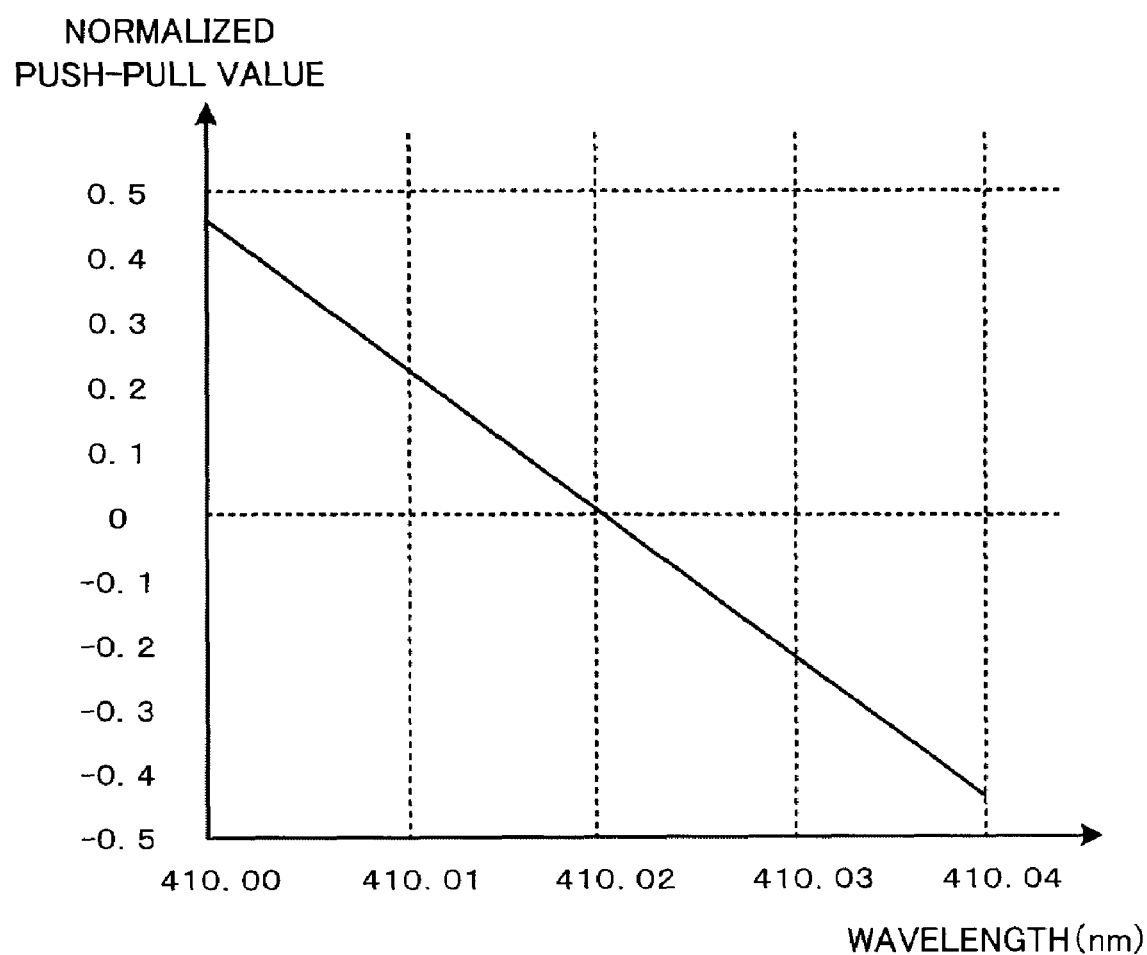
FIG. 15 is a graph showing normalized values of the push-pull values shown in FIG. 14.

Since the push-pull values obtained in such a manner vary as the amount of light increases or decreases, it is preferred that the push-pull values be normalized with an addition signal. FIG. 15 shows the relationship between normalized push-pull values and wavelengths.

Figure 16:
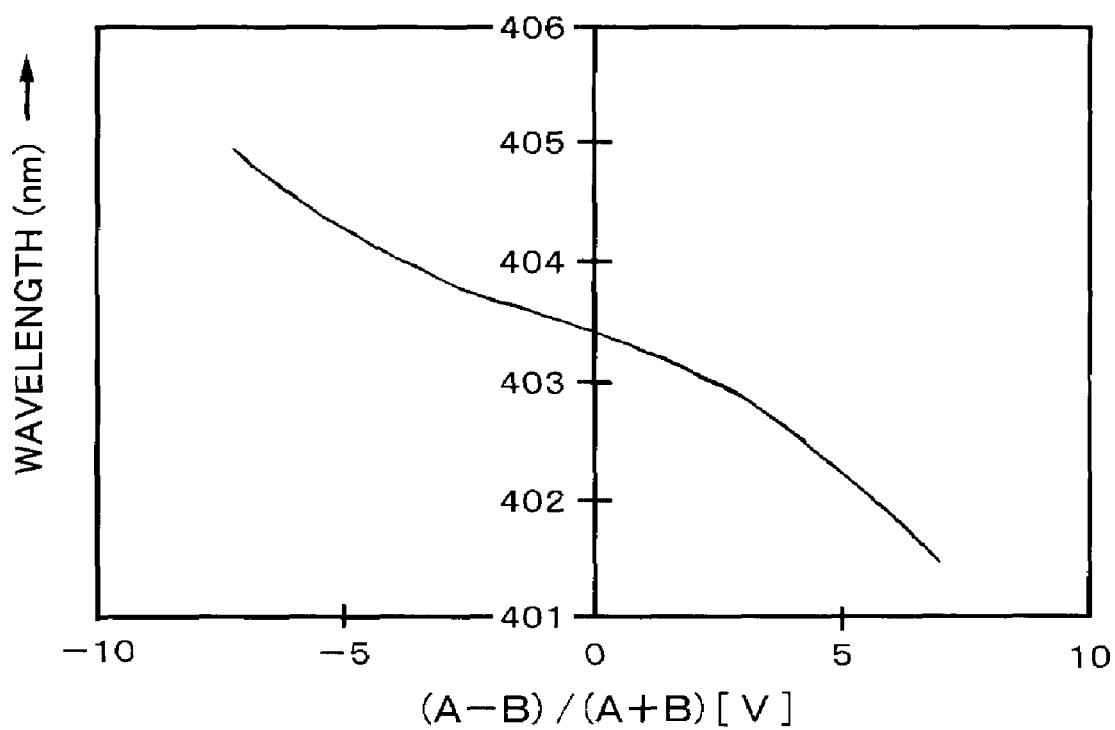
FIG. 16 is a graph showing an example of the variation of the wavelength of a tunable laser.

An embodiment of the present invention is a tunable laser apparatus. As shown in FIG. 16, in a tunable laser apparatus, by changing the angle of the grating, the wavelength is varied for around ±2 nm against the center wavelength, for example 403.5 nm. An output (A−B)/(A+B) is obtained by calculating detection signals A and B of which the position of a spot that varies corresponding to the wavelength of the laser is detected by a two-divided detector.

For example, the calculated output is set for 0 at the center frequency. When data are recorded on a hologram medium by wavelength multiplexing method, it is necessary to change the wavelength at a step of around 100 pm. This wavelength change step corresponds to a grating rotation angle of 0.015°.

However, as the angle of the grating is changed, the direction of zero-th order light L0 varies. Thus, there is a problem when the laser apparatus is used as a light source. A structure that can solve such a problem is described in T. M. Hard, "Laser Wavelength Selection and Output Coupling by a Grating", APPLIED OPTICS, Vol. 9, No. 8, August 1970, pp 1825-1830. In this structure, a grating and a mirror are disposed so that exit light takes the same optical path as incident light even if the angle of the grating is changed.

Figure 17:
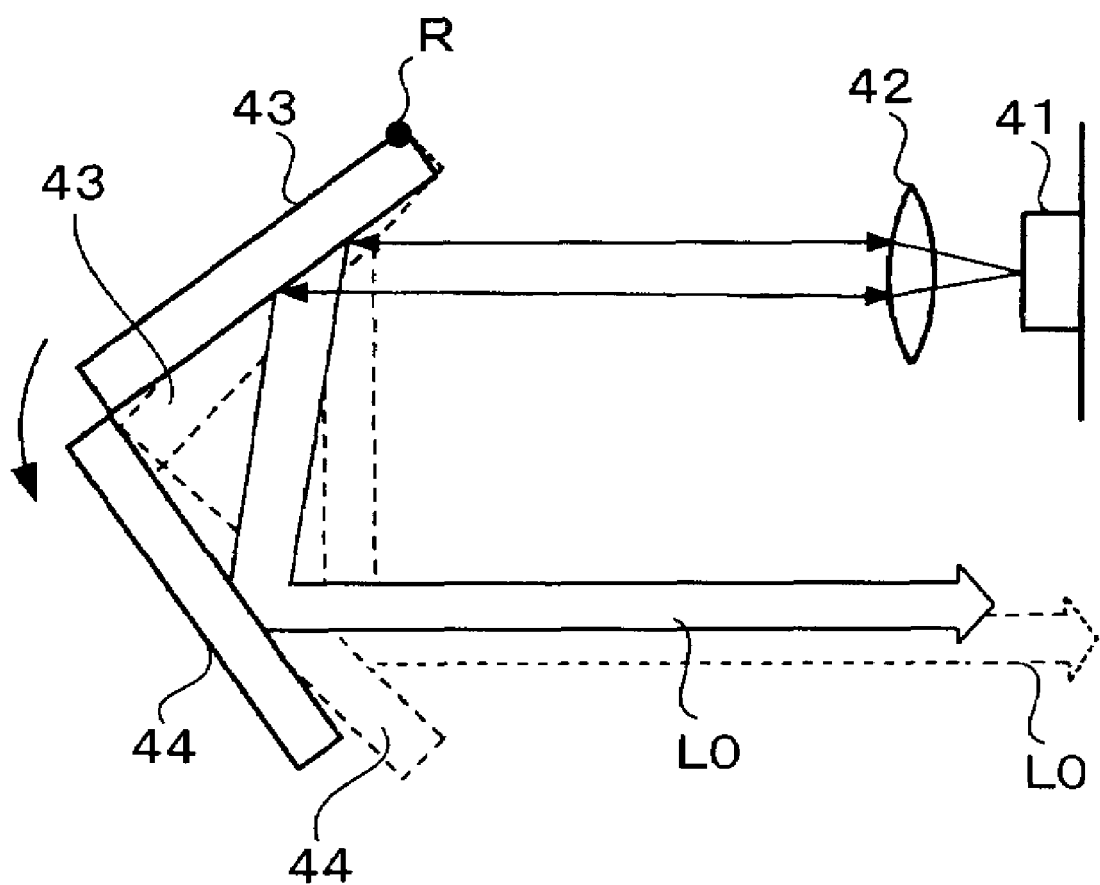
FIG. 17 is a schematic diagram showing a structure of a mirror-set Littrow type laser.

FIG. 17 shows such a laser apparatus. A grating 43 and a mirror for example a half mirror 44 are oppositely disposed at an open angle of for example 90°. Laser light emitted by a laser diode 41 is reflected on the grating 43 through a collimate lens 42. Thereafter, the light is reflected by the half mirror 44. Thereafter, the reflected light exits from the laser apparatus. The grating 43 and the half mirror 44 are rotated around a rotation axis R while the open angle is kept. The rotation axis R is disposed on the other end of the grating 43. The rotation axis R is perpendicular to an optical axis of laser light emitted from the laser diode 41. In addition, the rotation axis R extends in parallel with the direction of grooves of the grating 43. In this specification, "half" of the half mirror does not mean a transmissivity of 50%. Thus, the half mirror 44 is a mirror that generates a small amount of transmitted light having a low transmissivity of 10% or less, for example 5%.

The exit position of zero-th order light L0 in the case that the grating 43 and the half mirror 44 are placed in a position denoted by solid lines is different from that in the case that they are rotated and placed in a position denoted by dotted lines. It is not preferred that the exit position of zero-th order light vary when it is used as a laser light source.

Figure 18:
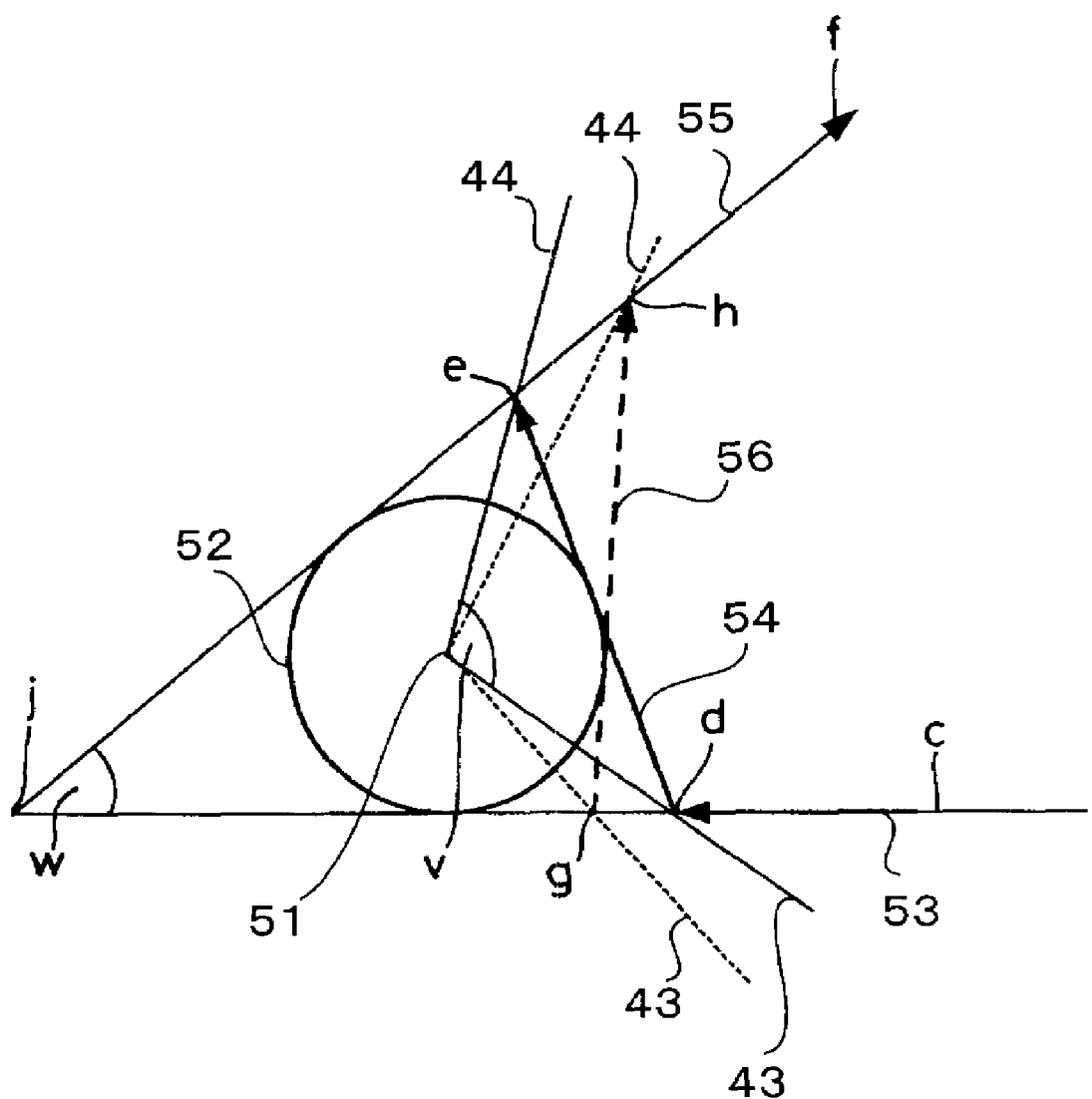
FIG. 18 is a schematic diagram describing that the direction of laser light emitted from a mirror-set Littrow type laser does not vary.

Next, with reference to FIG. 18, a mechanism that allows the direction of exit laser light not to vary when the grating 43 and the half mirror 44 are rotated will be described. One end of the grating 43 and one end of the half mirror 44 are connected at the position of the intersection of an extended line of the reflection surface of the grating 43 and an extended line of the reflection surface of the half mirror 44 to a rotation axis 51 that is level with an extended direction of grooves of the grating 43. The rotation axis 51 is also the center of the circle 52. The angle formed of the reflection surface of the grating 43 and the reflection surface of the half mirror 44 is denoted by V.

When predetermined incident light 53 travels from point c to point d, the incident light 53 enters the grating 43 at point d. Zero-th order light 54 is reflected at the same angle as the incident angle. The zero-th order light 54 travels to point e. The half mirror 44 receives the zero-th order light 54. Reflected light 55 exits from the half mirror 44 to point f. An extended line of the incident light 53 and an extended line of the reflected light 55 are intersected as point j. These extended lines and a line of the zero-th order light 53 are tangents of the circle 52.

When the grating 43 and the half mirror 44 are rotated around the rotation axis 51 while the angle V is kept, they are moved to a position denoted by dotted lines. At this point, the predetermined incident light 53 extends from point c to point g. The predetermined incident light 53 extends from point c to point g. The incident light 53 enters the grating 43 at point g. Zero-th order light 56 exits from the grating 43. The zero-th order light 56 extends from point g to point h. The zero-th order light 56 is reflected at point h by the half mirror 44. The reflected light 55 extends from point h to point f.

After the grating 43 and the half mirror 44 are rotated, an extended line of the incident light 53, an extended line of the reflected light 55, and a line of the zero-th order light 56 are tangents of the circle 52. Thus, when the grating 43 and the half mirror 44 are rotated with a fulcrum that is the intersection of the extended line of the reflection surface of the grating 43 and the extended line of the reflection surface of the half mirror 44, the angle W of the predetermined incident light 53 and the reflected light 55 is kept constant.

According to this theory, even if the inclination of the grating 43 is changed, the output laser light can be emitted to a constant position. As a result, a tunable laser whose wavelength can be changed can be accomplished.

Figure 19:
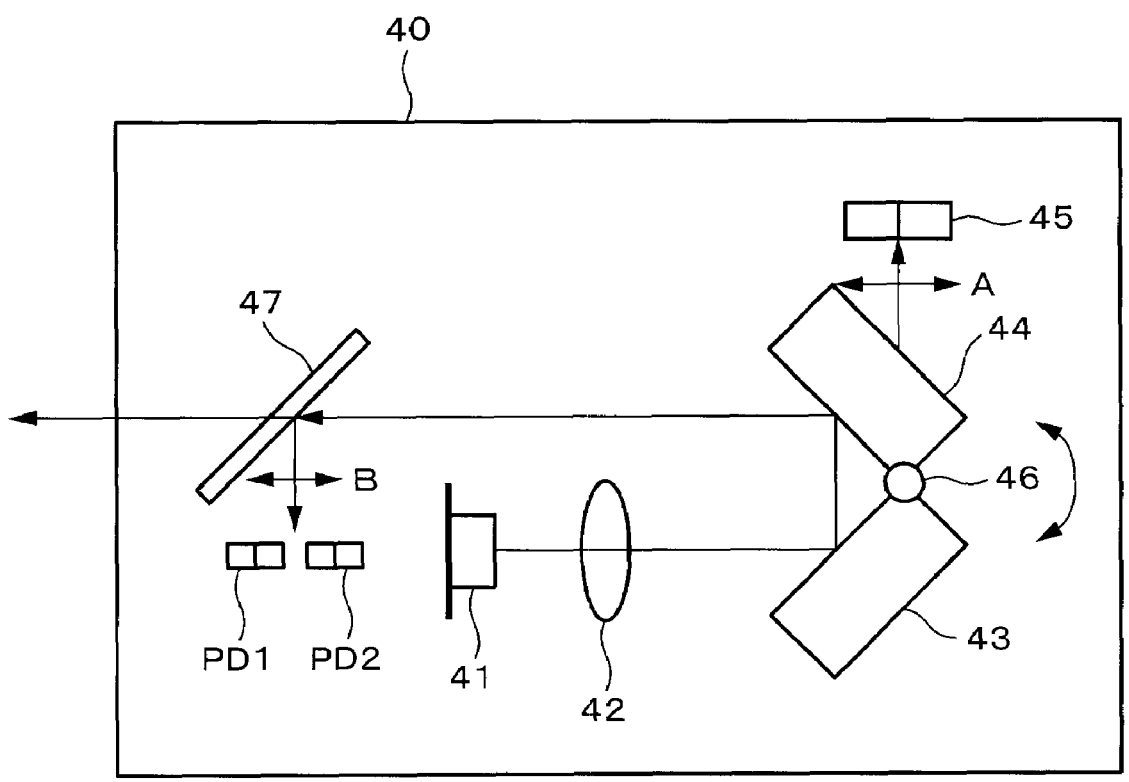
FIG. 19 is a schematic diagram showing a structure of a laser apparatus according to an embodiment of the present invention.

FIG. 19 shows a structure of an embodiment of the present invention. A laser 40 has a laser diode 41, a collimate lens 42, a grating 43, a half mirror 44, and a two-divided detector 45. The grating 43 and the half mirror 44 are rotated around an axis 46 as a fulcrum while a predetermined angle is kept. The laser diode 41 emits multi mode laser light. The collimate lens 42 collimates the laser light.

A support member (not shown) that supports the rear surfaces of the grating 43 and the half mirror 44 is disposed. The support member is rotated by a linear motor that uses a piezoelectric element which expands and shrinks by Piezoelectric effect and thereby linearly moves. As was described above, when the grating 43 and the half mirror 44 are rotated, the direction and position of the reflected laser light do not vary. The reflected laser light is used as a light source for a holographic data storage.

The grating 43 diffracts first order light in the direction that varies corresponding to the wavelength. The angle of the grating 43 is set so that first order light having a predetermined wavelength for example 410 nm returns to the laser diode 41. As a result, only the component having the predetermined wavelength becomes large in the laser diode 41. As a result, the laser diode 41 emits single mode laser light. Most of laser light that the laser diode 41 emits is zero-th order light rather than first order light. Thus, by changing the angle of the grating 43, the oscillation wavelength of an external cavity type semiconductor laser called Littrow type can be changed.

Transmitted light of the half mirror 44 enters the two-divided detector 45. The two-divided detector 45 is secured to a base. The two-divided detector 45 monitors the wavelength that is varied for e.g. ±2 nm in the tunable laser. A unit that monitors the variation of the wavelength of the tunable laser is referred to as a wavelength monitor or a wavelength monitoring two-divided detector.

Zero-th order light reflected by the half mirror 44 enters an optical wedge 47. Reflected light of the optical wedge 47 is received by two sets of two-divided detectors PD1 and PD2. Transmitted light exits from the optical wedge 47 as output light. The output light is used as a light source of for example a holographic data storage. The optical wedge 47 and the two-divided detectors PD1 and PD2 monitor the variation of a wavelength of for example 0.04 nm. A unit that monitors the variation of the wavelength due to a mode hop is referred to as a wavelength variation monitor or a wavelength variation monitoring two-divided detector.

The direction of laser light that is reflected by the grating 43 and entered into the half mirror 44 varies with the angle of the grating 43. Thus, when the angle of the grating 43 is changed, the incident position of light to the two-divided detector 45 varies as denoted by arrow A. When the variation of the incident position is detected, the variation of the wavelength of the laser light can be detected.

Figure 20:
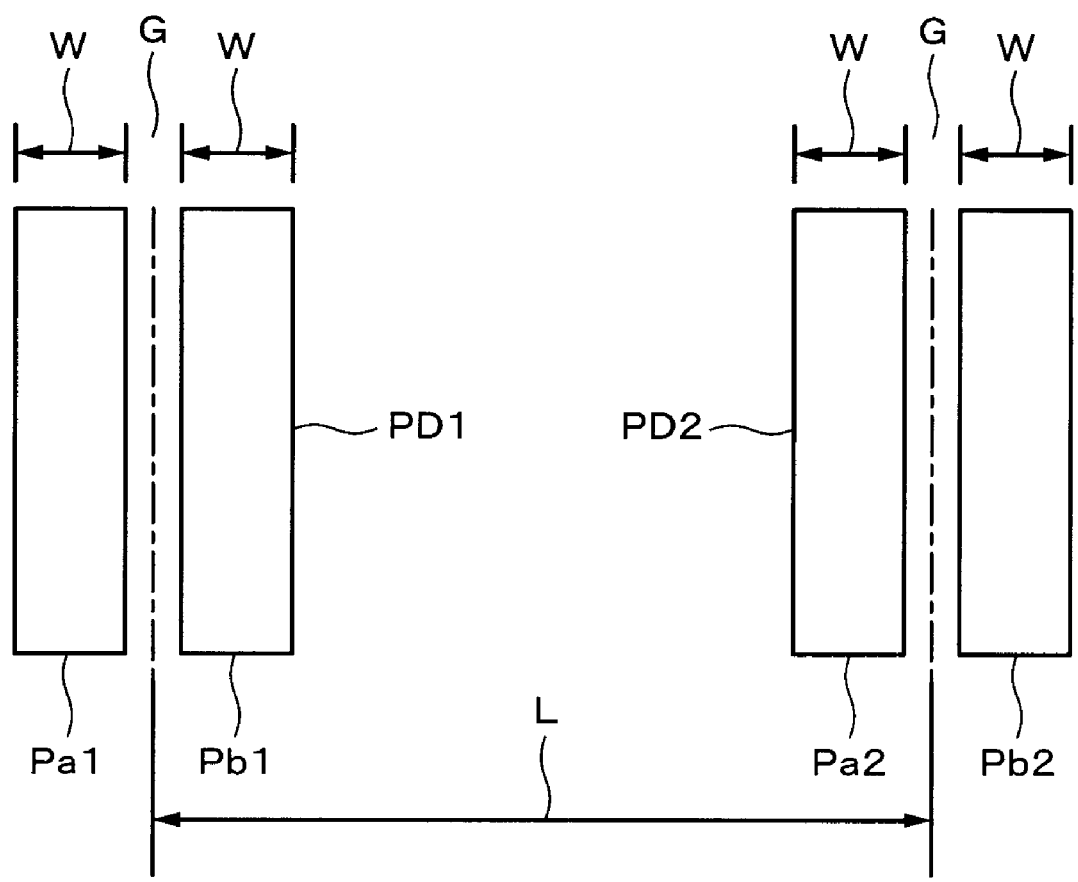
FIG. 20 is a schematic diagram showing an example of the arrangement of two sets of two-divided detectors according to an embodiment of the present invention.

FIG. 20 shows an arrangement of two sets of two-divided detectors PD1 and PD2. Reflected light of the optical wedge 47 is emitted to light reception surfaces of the two sets of two-divided detectors PD1 and PD2 for example in the direction perpendicular to the drawing. The two-divided detector PD1 is composed of detectors Pa1 and Pb1 aligned with gap G to the center (denoted by a dot-and-dash line). Each of the detectors Pa1 and Pb1 has width W. Likewise, the two-divided detector PD2 is composed of detectors Pa2 and Pb2 that are aligned in the same manner as the two-divided detector PD1. Length L between the centers of the two sets of two-divided detectors PD1 and PD2 on the plane perpendicular to the optical path of the reflected light of the optical wedge 47 is an odd-number multiple of nearly ¼ period of interference fringes. The period of the interference fringes can be varied for around 10% by changing the wavelength of the laser light for several nm. The variation of the wavelength of the laser light can be detected corresponding to the movement of the interference fringes, namely the variation of the phase.

By adjusting the angle and thickness of the optical wedge 47, the period of the interference fringes can be adjusted. For example, the period of interference fringes is adjusted to 300 μm. In this case, since 2π/4 is 75 μm, the length is set for L=75 ×7=525 μm. In addition, the width and gap are set for W=130 μm and G=30 μm, respectively.

Figure 21:
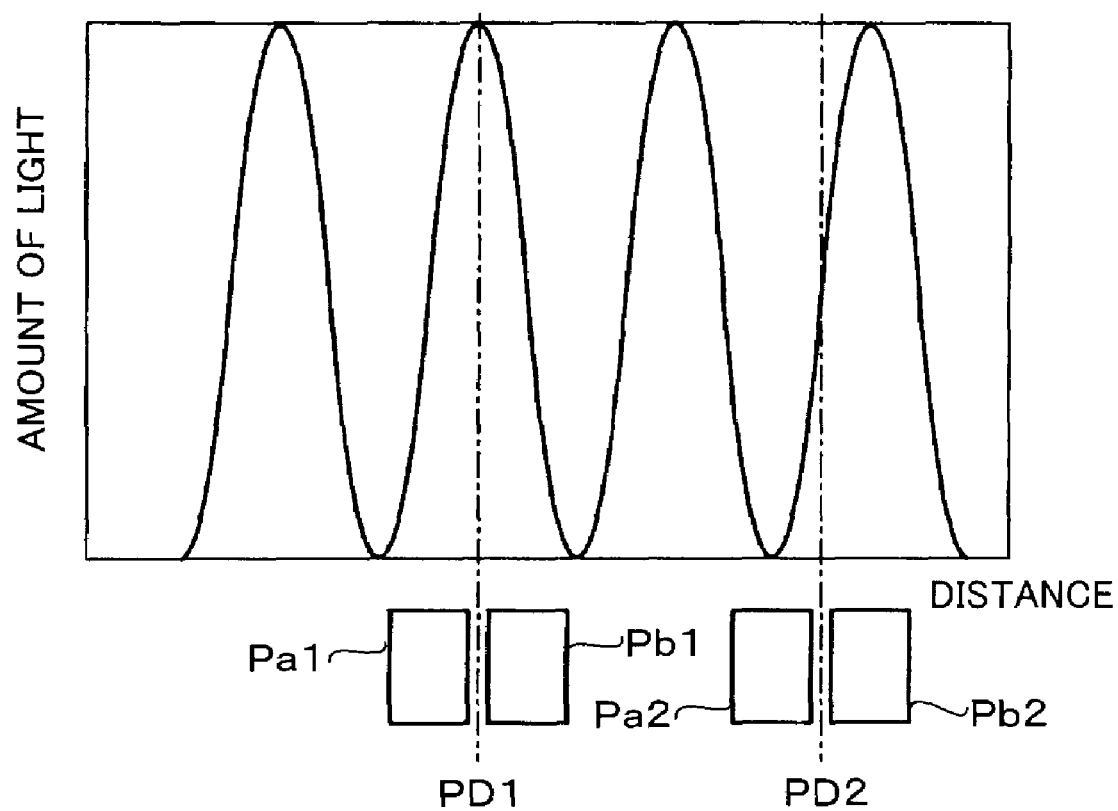
FIG. 21 is a schematic diagram showing an example of which one of the two sets of two-divided detectors can detect the variation of the wavelength.
Figure 22:
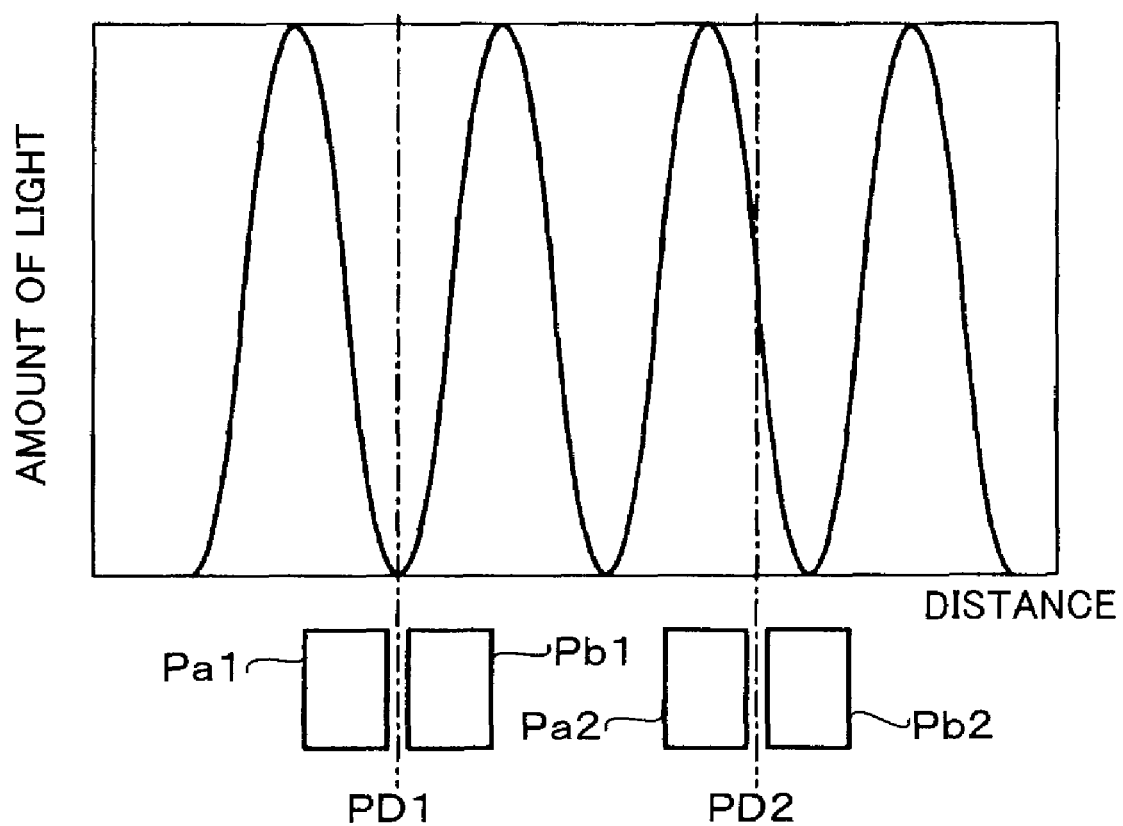
FIG. 22 is a schematic diagram showing another example of which one of the two sets of two-divided detectors can detect the variation of the wavelength.
Figure 23:
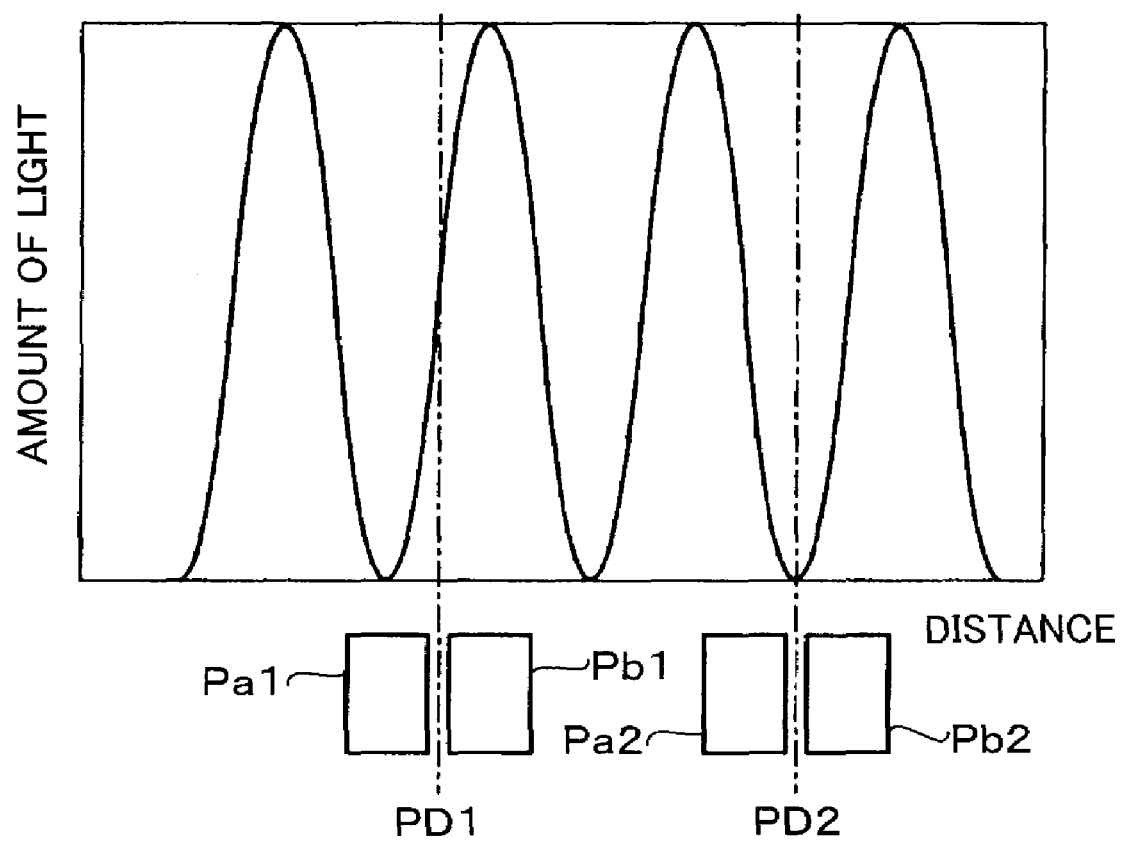
FIG. 23 is a schematic diagram showing an example of which the other of the two sets of two-divided detectors can detect the variation of the wavelength.
Figure 24:
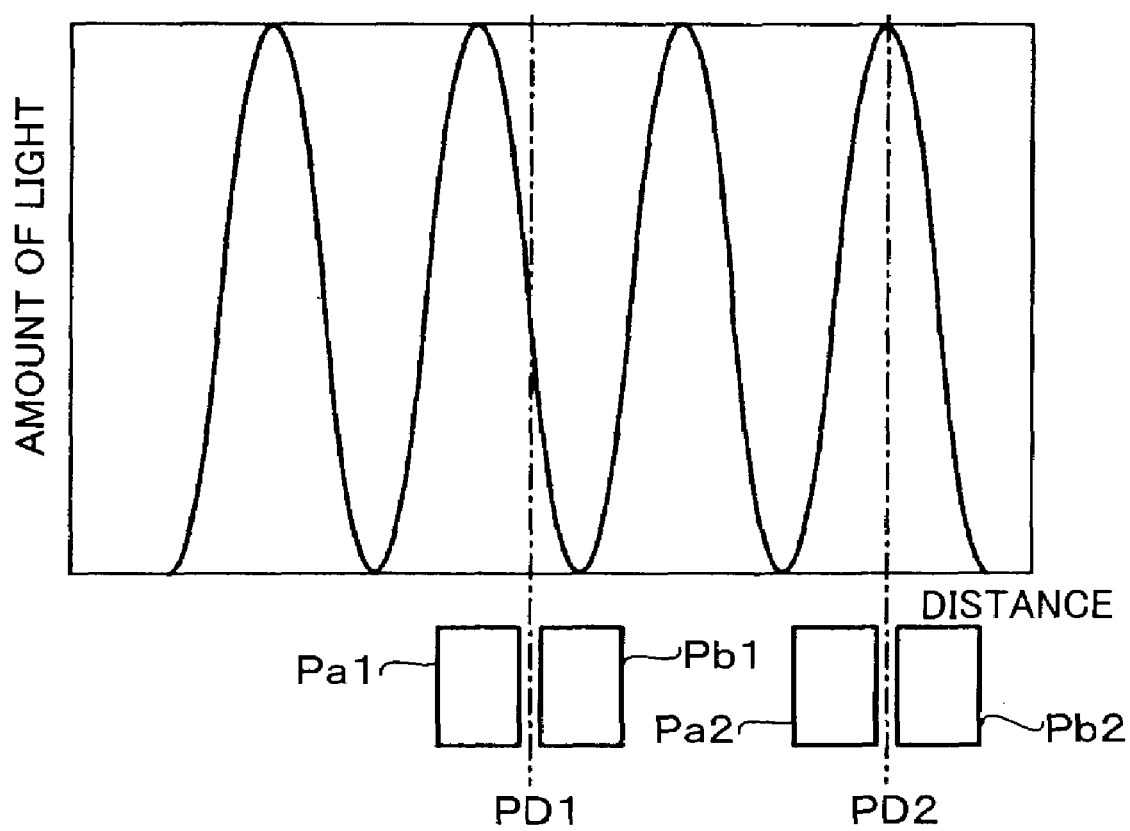
FIG. 24 is a schematic diagram showing another example of which the other of the two sets of two-divided detectors can detect the variation of the wavelength.

The length L is set for an odd-number multiple of nearly ¼ period of interference fringes so that when one two-divided detector is placed in an inconvenient wavelength measurement position, the other two-divided detector is used. When the center of the two-divided detector PD1 nearly matches the maximum value of interference fringes as shown in FIG. 21 and when the center of the two-divided detector PD1 nearly matches the minimum value of interference fringes as shown in FIG. 22, the two-divided detector PD1 is selectively used to detect the wavelength. On the other hand, when the center of the two-divided detector PD2 nearly matches the minimum value of interference fringes as shown in FIG. 23 and when the center of the two-divided detector PD2 nearly matches the maximum value of interference fringes as shown in FIG. 24, the two-divided detector PD2 is selectively used to detect the wavelength. Instead, three or more sets of two-divided detectors may be used.

Figure 25:
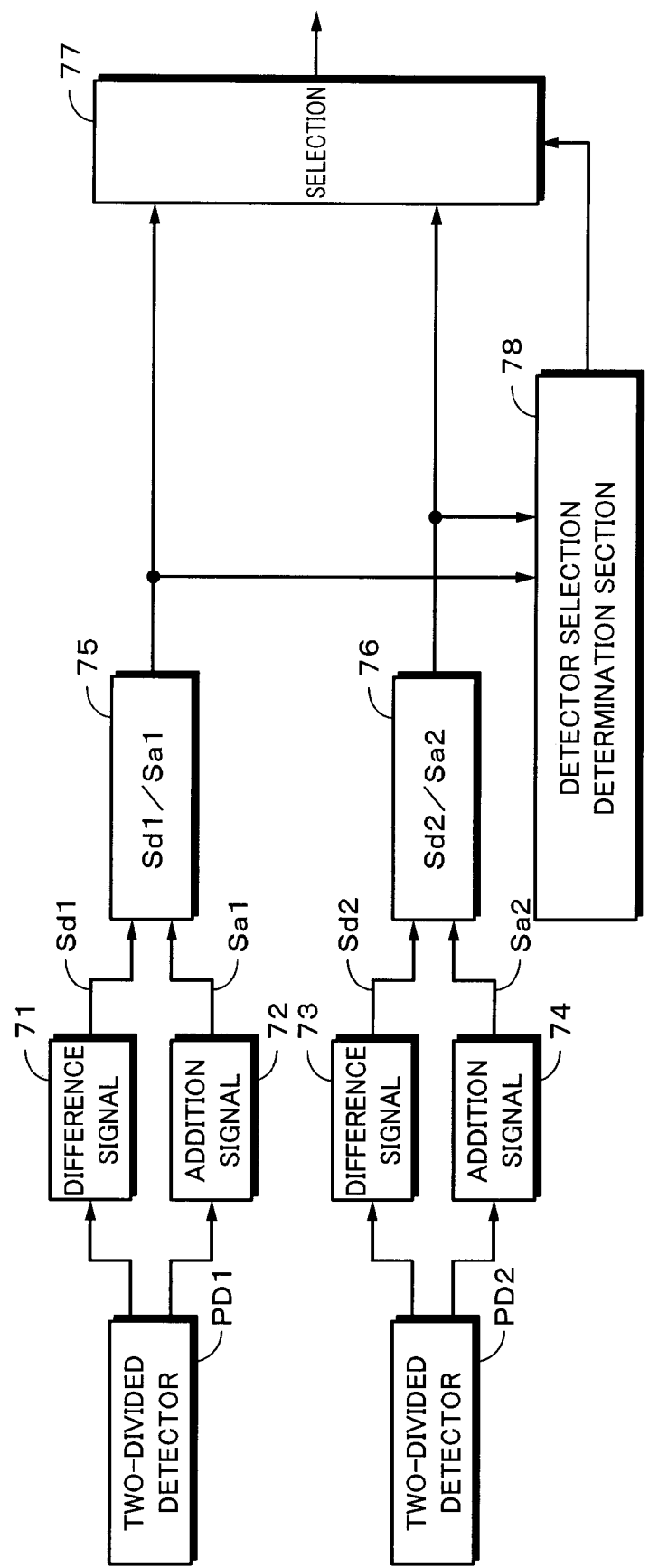
FIG. 25 is a block diagram showing an example of a structure of which output signals of the two sets of two-divided detectors are processed by hardware.

Next, with reference to FIG. 25, a wavelength detecting process of an analog circuit will be described. Output signals of two detectors Pa1 and Pb1 of the two-divided detector PD1 are supplied to each of a difference signal calculation circuit 71 and an addition signal calculation circuit 72. The difference signal calculation circuit 71 and the addition signal calculation circuit 72 obtain a difference signal Sd1 and an addition signal Sa1, respectively. Output signals of two detectors Pa2 and Pb2 of the two-divided detector PD2 are supplied to each of a difference signal calculation circuit 73 and an addition signal calculation circuit 74. The difference signal calculation circuit 73 and the addition signal calculation circuit 74 obtain a difference signal Sd2 and an addition signal Sa2, respectively.

A division circuit 75 divides Sd1 by Sa1 so as to normalize the difference signal Sd1. A division circuit 76 divides Sd2 by Sa2 so as to normalize the difference signal Sd2. The normalized difference signals are supplied to each of a selection section 77 and a detector selection determination section 78. The selection section 77 selects one of the normalized difference signals corresponding to an output of the detector selection determination section 78 and outputs the selected normalized difference signal. An output signal of the selection section 77 is supplied to a laser power control section (not shown). The laser power control section controls the laser power so as to prevent laser light from being generated in an unusable region due to a mode hop.

The detector selection determination section 78 selects one of the two sets of two-divided detectors depending on which of them is close to a suitable position at which the variation of the wavelength can be detected by comparing the values of the output signals thereof. According to an embodiment of the present invention, the normalized difference signal is output in the range of for example ±12 V. A two-divided detector that outputs a smaller absolute value of a normalized difference signal than other is close to the suitable position. As was described with reference to FIG. 21 to FIG. 24, since the numerator is a difference signal, when the absolute value of an output normalized difference signal of a two-divided detector is smaller than other, the center of the two-divided detector is close to the maximum value or the minimum value. In addition, the normalized difference signal is used as the wavelength variation detection signal so as to cancel the variation of the difference signal due to the variation of the power.

When the condition of |Sd1/Sa1|<|Sd2/Sa2| is satisfied, the detector selection determination section 78 generates a selection control signal in high level to select Sd1/Sa1 as a wavelength variation detection signal. When the condition of |Sd1/Sa1|>|Sd2/Sa2| is satisfied, the detector selection determination section 78 generates the selection control signal in low level to select Sd2/Sa2 as the wavelength variation detection signal. When the condition of |Sd1/Sa1|=|Sd2/Sa2| is satisfied, the detector selection determination section 78 selects one of Sd1/Sa1 and Sd2/Sa2 as the wavelength variation detection signal. The detector selection control signal may be generated with the absolute values |Sd1| and |Sd2| instead of the normalized difference signals.

Figure 26:
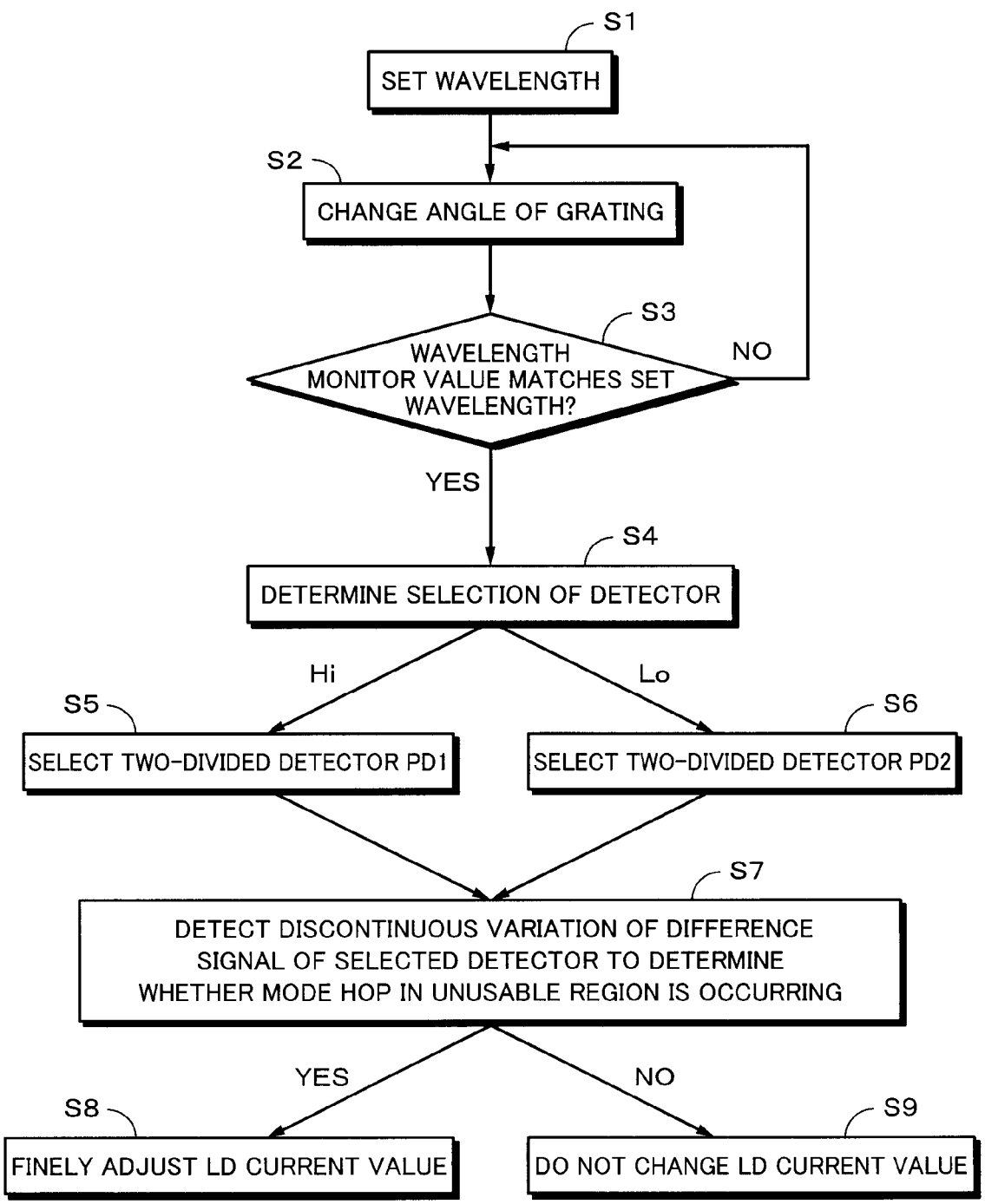
FIG. 26 is a block diagram showing an example of a structure of which output signals of the two sets of two-divided detectors are processed by software.

The wavelength selection determination process may be performed by not only hardware such as an analog circuit, but software of a microcomputer. FIG. 26 is a flow chart showing an example of a software process. At step S1, the wavelength of laser light that is output is set. Thereafter, the flow advances to step S2. At step S2, the angle of the grating is changed. Thereafter, the flow advances to step S3. At step S3, the microcomputer determines whether the detected wavelength of the wavelength monitor that uses the two-divided detector 45 matches the set value. When they do not match, the flow returns to step S2. At step S2, the angle of the grating 43 is changed.

When the determined result at step S3 denotes that the detected wavelength of the wavelength monitor matches the set value, the flow advances to step S4. At step S4, the determination is made with the absolute values of the difference signals in the foregoing manner. When the determined result denotes high level, the flow advances to step S5. At step S5, the two-divided detector PD1 is selected. When the determined result denotes low level, the flow advances to step S6. At step S6, the two-divided detector PD2 is selected.

At step S7, the variation of the wavelength is detected from the normalized difference signal of the selected two-divided detector to determine whether a mode hop is occurring. When the mode hop is occurring, the level of the normalized difference signal discontinuously varies. When the mode hop is occurring, the flow advances to step S8. At step S8, the drive current value of the laser diode 41 is finely adjusted. For example, the drive current value is changed for example in the range from several tenth mA to several mA. When no mode hop is occurring, the flow advances to step S9. At step S9, the drive current value of the laser diode 41 is not changed.

Figure 27:
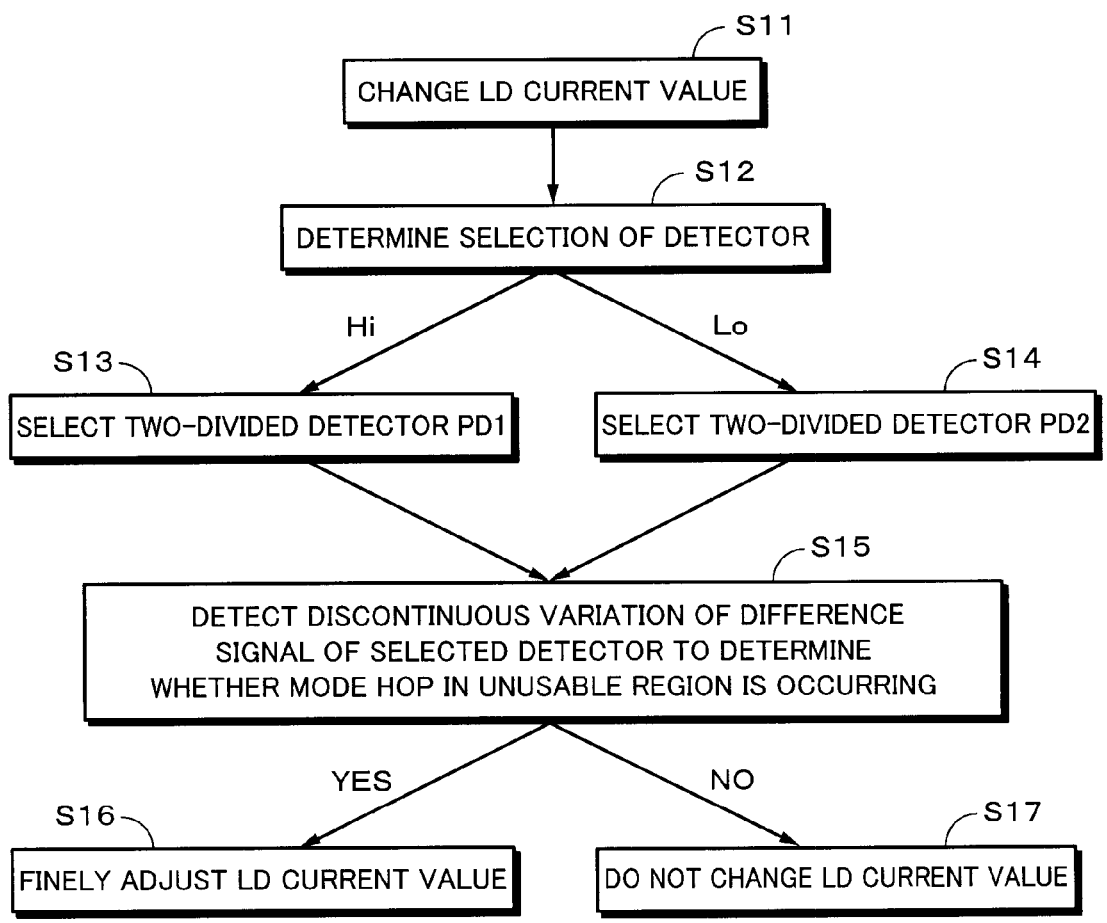
FIG. 27 is a block diagram showing another example of a structure of which output signals of the two sets of two-divided detectors are processed by software.

Next, with reference to a flow chart shown in FIG. 27, a laser power changing process will be described. The laser power changing process is performed by changing the current value of the laser diode 41. At step S11, the current value is changed. Thereafter, the flow advances to step S12. At step S12, as was described above, the detector selection determination process is performed using the absolute values of the difference signals. When the determined result denotes high level, the flow advances to step S13. At step S13, the two-divided detector PD1 is selected. When the determined result denotes low level, the flow advances to step S14. At step S14, the two-divided detector PD2 is selected.

Thereafter, the flow advances to step S15. At step S15, the variation of the wavelength is detected from the normalized difference signal of the selected two-divided detector to determine whether a mode hop is occurring. When the discontinuous variation of the level of the normalized difference signal of the two-divided detector has been detected, it is determined that a mode hop is occurring. When the mode hop is occurring, the flow advances to step S16. At step S16, the drive current value of the laser diode 41 is finely adjusted. When the mode hop is not occurring, the flow advances to step S17. At step S17, the drive current value of the laser diode 41 is not changed.

According to the foregoing embodiment of the present invention, when the period of interference fringes generated by the optical wedge 47 does not match the distance of the centers of the two sets of two-divided detectors PD1 and PD2, an optical element may be disposed between the optical wedge 47 and the two-divided detectors PD1 and PD2 so as to change the period of the interference fringes.

Figure 28:
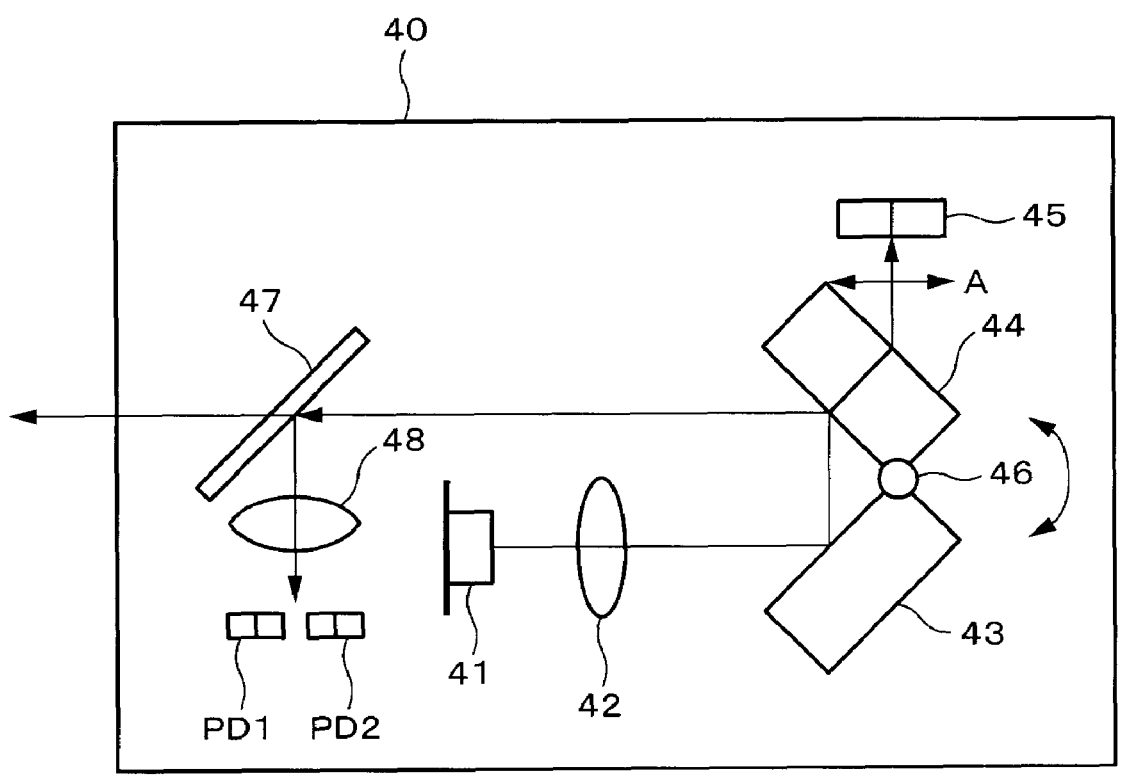
FIG. 28 is a schematic diagram showing a first example of which a part of an embodiment of the present invention is modified.

FIG. 28 shows a structure of which a convex lens 48 is disposed between the optical wedge 47 and the two sets of two-divided detectors PD1 and PD2. The convex lens 48 allows the period of the interference fringes to be decreased. In contrast, a concave lens allows the period of interference fringes to be increased.

Figure 29:
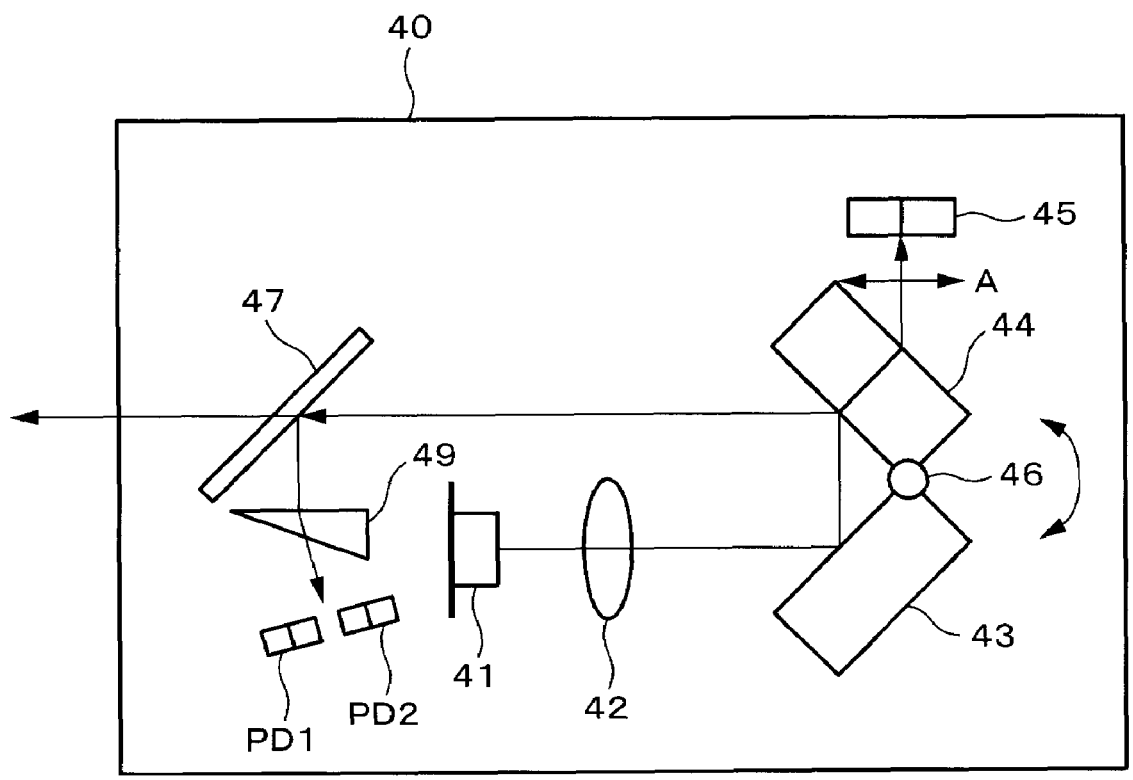
FIG. 29 is a schematic diagram showing a second example of which a part of an embodiment of the present invention is modified.

As shown in FIG. 29, a prism 49 may be disposed between the optical wedge 47 and the two sets of two-divided detectors PD1 and PD2 so as to change the period of interference fringes. Instead, with another optical element such as a cylindrical lens, the period of interference fringes may be adjusted.

Figure 30:
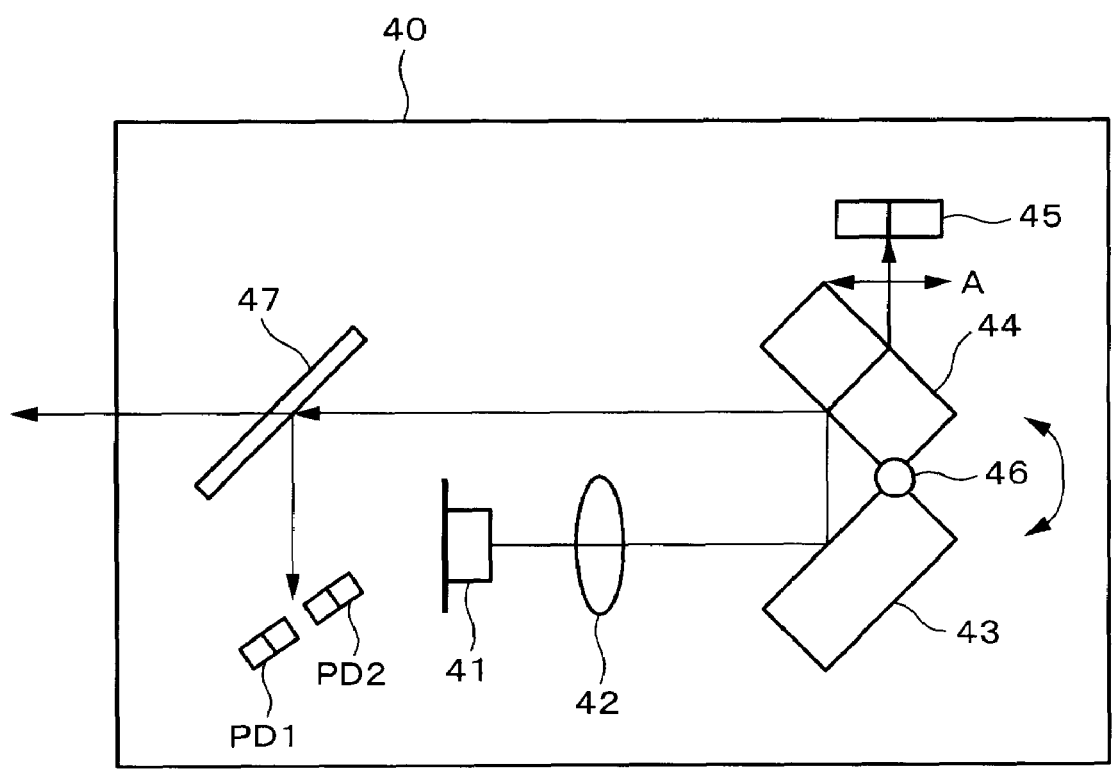
FIG. 30 is a schematic diagram showing a third example of which a part of an embodiment of the present invention is modified.
Figure 31A:
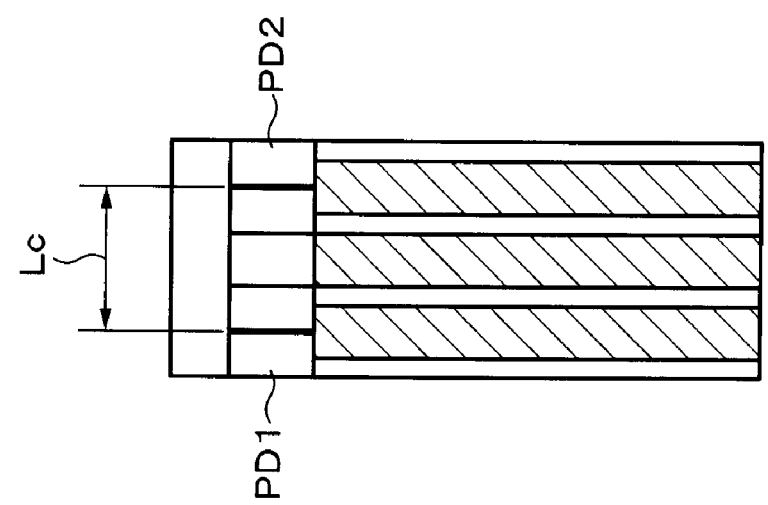
FIG. 31A, FIG. 31B, and FIG. 31C are schematic diagrams describing the third example.
Figure 31B:
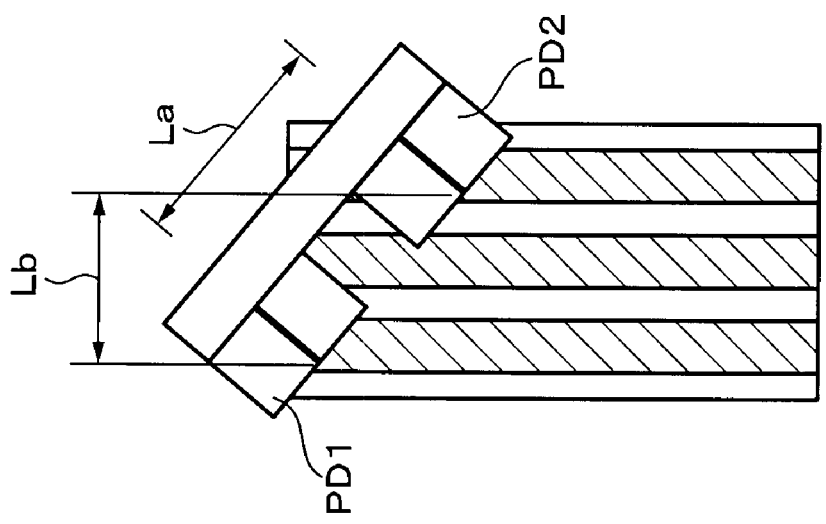
Figure 31C:
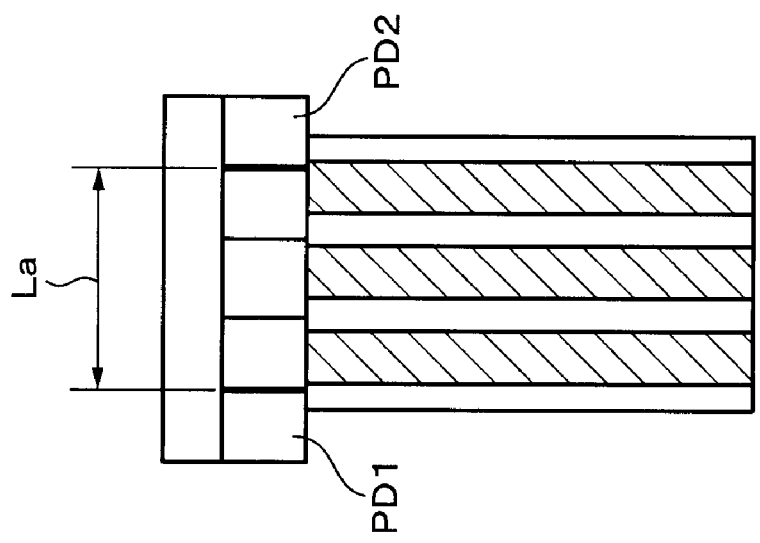

FIG. 30 shows a structure of which light reception surfaces of the two-divided detectors PD1 and PD2 are inclined from the optical axis of the reflected light of the optical wedge 47. In this example, as shown in FIG. 31A and FIG. 31B, although the physical distance La between the two-divided detectors PD1 and PD2 is the same, the distance of the two-divided detectors PD1 and PD2 on a plane perpendicular to the optical axis of the reflected light becomes Lb. Thus, it means that the distance between the two-divided detectors PD1 and PD2 is changed from La to Lb. According to an embodiment of the present invention, the distance Lb between the centers of the two-divided detectors PD1 and PD2 on the plane perpendicular to the optical path of the reflected light is set for an odd-number multiple of nearly ¼ period of interference fringes. To allow the intervals of interference fringes to be the same as those shown in FIG. 31A, namely the distance of interference fringes on the plane perpendicular to the reflected light to be the same as La, it is necessary to cause the physical distance of the two-divided detectors PD1 and PD2 to be larger than La. In the example shown in FIG. 31B, the distance La is larger than the distance Lb. This arrangement is equivalent to an arrangement of which the two-divided detectors PD1 and PD2 are disposed with a distance of Lc=Lb on the plane perpendicular to the optical path of the reflected light as shown in FIG. 31C. As a result, it can be considered that the intervals of interference fringes may be narrower than those of interference fringes shown in FIG. 31A. When there is one set of a two-divided detector, the structure shown in FIG. 30A to FIG. 30C can be effectively used to properly adjust the period of interference fringes, the distance of the two detectors, and the width thereof.

Figure 32:
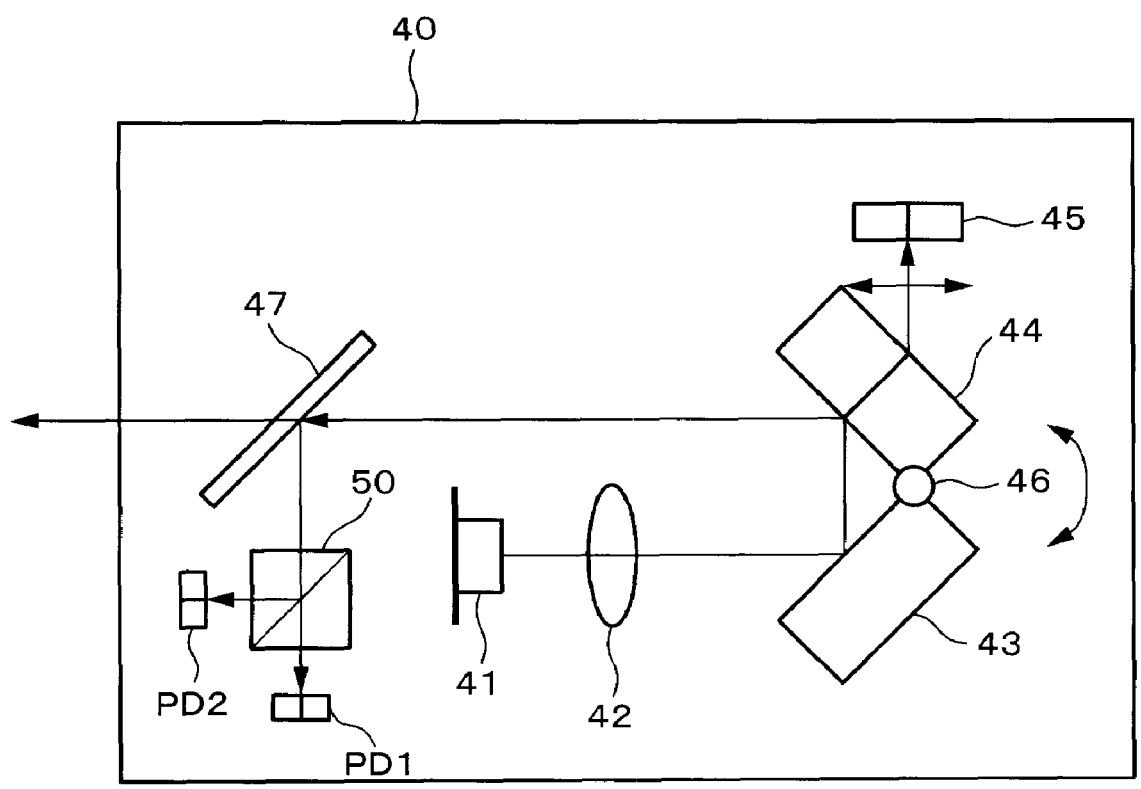
FIG. 32 is a schematic diagram showing a fourth example of which a part of an embodiment of the present invention is modified.

As shown in FIG. 32, reflected light of the optical wedge 47 may be split into two beams by a beam splitter 50. Two sets of two-divided detectors PD1 and PD2 may be disposed so that they can receive the split beams. In this case, the distance of the two-divided detectors PD1 and PD2 for interference fringes is set in the foregoing manner.

Next, another embodiment of the present invention will be described. According to the embodiment, three detectors Px, Py, and Pz are used instead of two sets of two-divided detectors. The three detectors Px, Py, and Pz are arranged in the direction of which interference fringes occur. The detector Py sandwiched by the detectors Px and Pz composes two-divided detectors with the detectors Px and Pz.

Figure 33A:
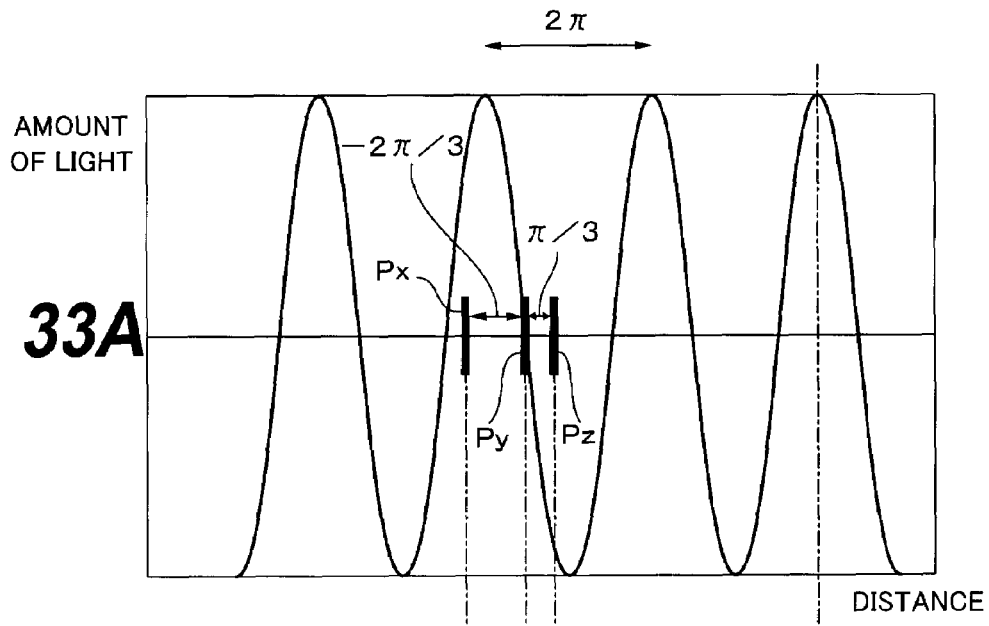
FIG. 33A and FIG. 33B are schematic diagrams describing another embodiment of the present invention.
Figure 33B:
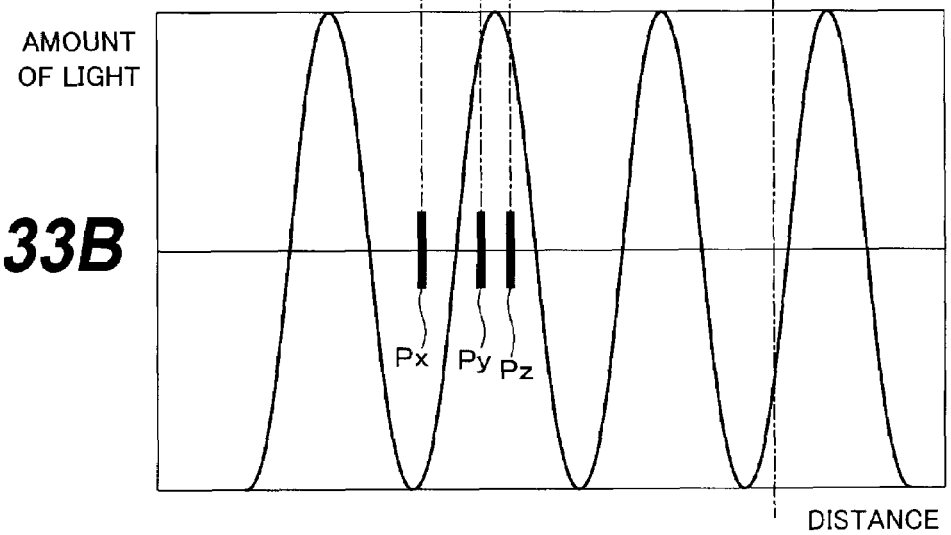

FIG. 33A shows an example of the arrangement of detectors when the period of interference fringes is $2\pi$. The detector Px is shifted from the detector Py by $(-2\pi/3)$. The detector Pz is shifted from the detector Py by $(-\pi/3)$. Thus, the distance between the detector Px and the detector Pz is $\pi$. FIG. 33B shows the case that interference fringes move.

In FIG. 33A, the center of the detectors Px and Py nearly matches the position of the maximum value of interference fringes. The center of the detectors Px and Py is shifted from the maximum value by $2\pi/3$. Thus, assuming that the detectors Px and Py compose the two-divided detector PD1 and the detectors Py and Pz compose the two-divided detector PD2, the arrangement of the two sets of two-divided detectors PD1 and PD2 shown in FIG. 21 can be accomplished. Thus, in the state shown in FIG. 33A, the variation of the wavelength is detected by the detectors Px and Py. In the state shown in FIG. 33B, the variation of the wavelength is detected by the detectors Py and Pz.

When the position of the detector Px is $-2\pi/3 - 2m\pi$ (where m is any integer) and the position of the detector Pz is $\pi/3 + 2n\pi$ (where n is any integer), the variation of the wavelength can be detected. When the widths of detectors are large, it is difficult to dispose them at intervals of $\pi/3$. In this case, it is effective to shift the detectors by $2n\pi$.

Figure 34A:
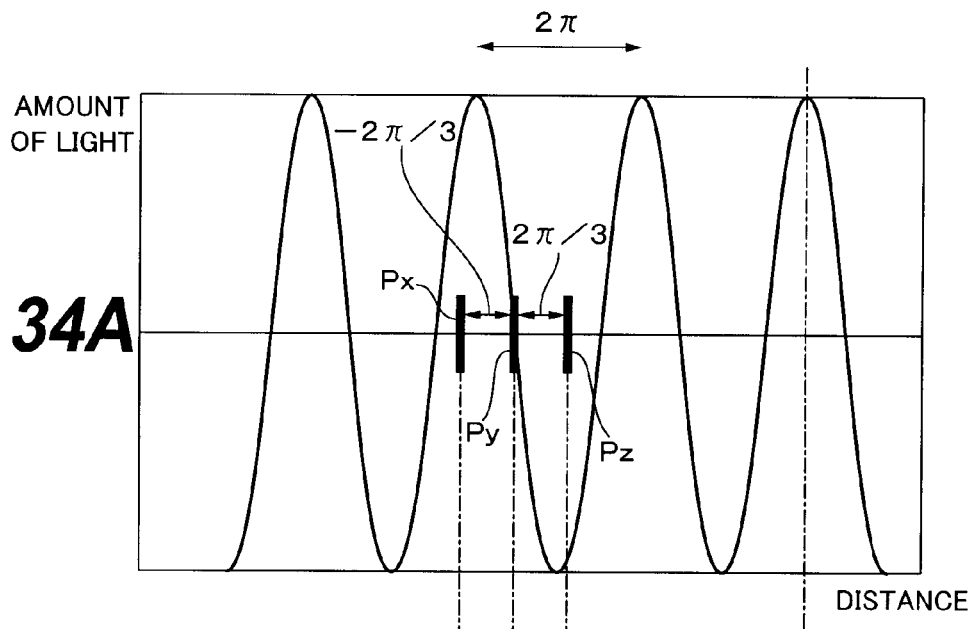
FIG. 34A and FIG. 34B are schematic diagrams describing another embodiment of the present invention.
Figure 34B:
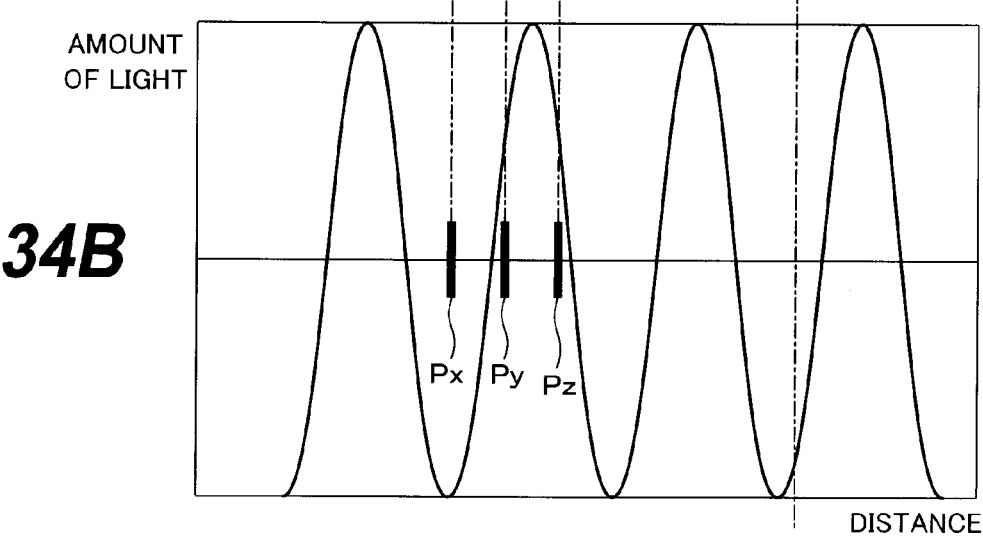

FIG. 34A and FIG. 34B show another example of distances of two detectors when a three-divided detector is used. A detector Px is shifted from a detector Py by $(-2\pi/3)$. A detector Pz is shifted from the detector Py by $(2\pi/3)$. Thus, the distance of the detector Px and the detector Pz is $4\pi/3$. FIG. 34B shows the case that interference fringes move by $2\pi/3$.

When the center of the detectors Px and Py nearly matches the position of the maximum value of interference fringes, the detectors Px and Py are selected to detect the variation of the wavelength. When the phase of the interference fringes is changed by $2\pi/3$ as shown in FIG. 34B, the detectors Py and Pz detect the variation of the wavelength.

Figure 35A:
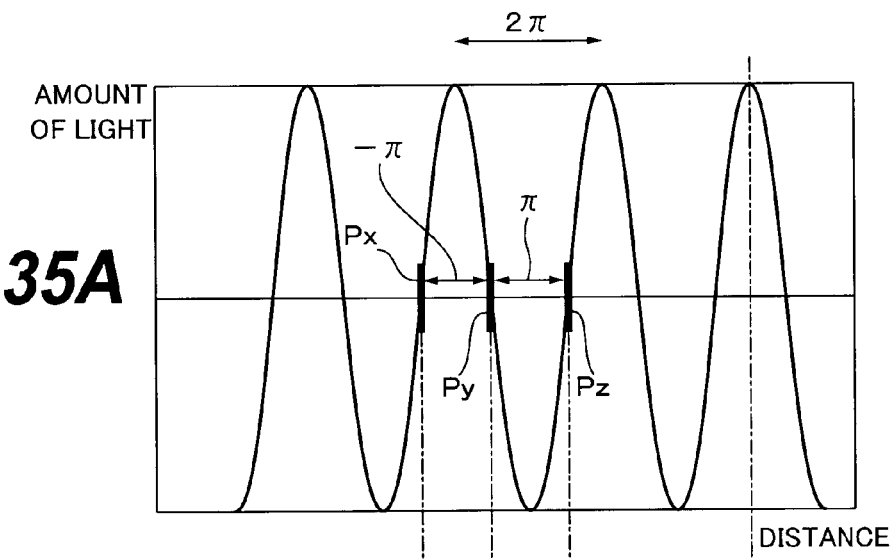
FIG. 35A and FIG. 35B are schematic diagrams showing a compared example describing another embodiment of the present invention.
Figure 35B:
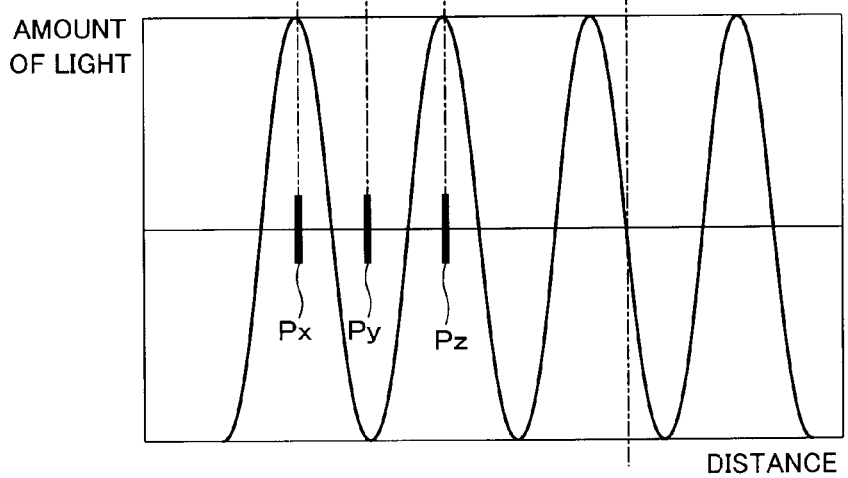

FIG. 35A and FIG. 35B show the case that the distance of two detectors is not suitable when the three-divided detector is used. A detector Px is shifted from a detector Py by $(-\pi)$. A detector Pz is shifted from the detector Py by $(\pi)$. FIG. 35B shows the case that interference fringes move by $\pi/4$.

In the state shown in FIG. 35A, any pair of the detectors Px and Py and detectors Py and Pz can detect the variation of the wavelength. However, in the state shown in FIG. 35B, where the interference fringes move, any pair of the detectors Px and Py and detectors Py and Pz may not detect the variation of the wavelength. The distance of detectors of each pair is selected so that when one pair of the detectors Px and Py and the detectors Py and Pz may not detect a mode hop, the other pair can detect it.

According to embodiments of the present invention, another external cavity type semiconductor laser such as Littman type may be used. In addition to a semiconductor laser, embodiments of the present invention may be applied as a laser generation source to a gas laser in which a mode is unstable.

Figure 36:
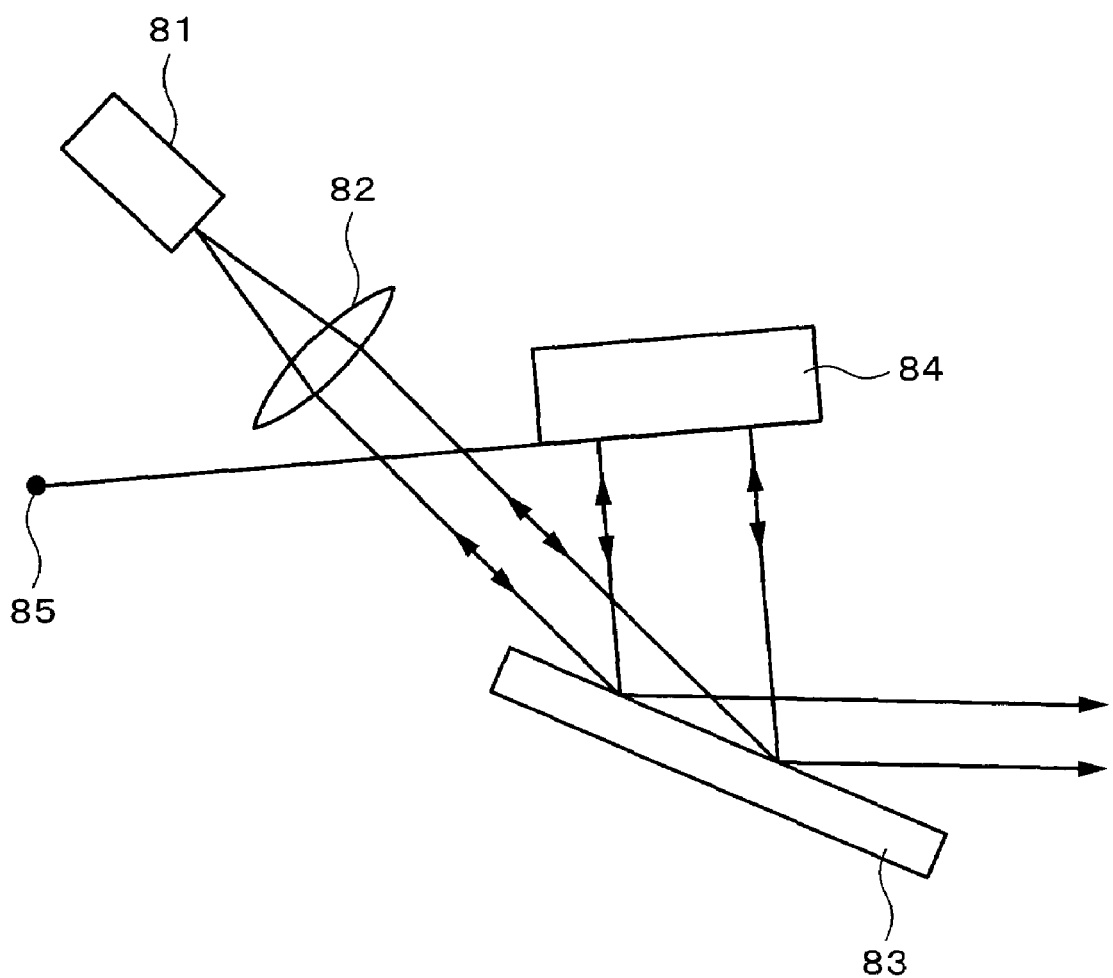
FIG. 36 is a schematic diagram showing an example of a Littman type laser according to an embodiment of the present invention.

FIG. 36 shows an example of a structure of a Littman type laser. Laser light emitted from a laser diode 81 enters a grating 83 through a collimate lens 82. Zero-th order light reflected on the grating 83 is obtained as output light. First order light diffracted by the grating 83 enters a tuning mirror 84. Reflected light of the tuning mirror 84 returns to the laser diode 81 through the grating 83. The laser light which returns to the laser diode 81 has a predetermined wavelength. As a result, laser light having a predetermined wavelength can be generated.

The tuning mirror 84 is rotated about a point 85 as the center of the rotation. The wavelength of output laser light is set with the angle of the tuning mirror 84. An optical wedge (not shown) is disposed in an optical path of the output light. Interference fringes generated by the optical wedge are detected by two or more sets of two-divided detectors or one or more sets of three-divided detectors.

According to an embodiment of the present invention, another optical element that has the same effect as the optical wedge may be used. When a glass whose both surfaces are flat is used instead of the optical wedge, if laser light is diffracted light or converged light, interference fringes vary as the wavelength varies like the optical wedge. Depending on the angle of incident laser light and flat glass, fringes of interference fringes may become nearly straight or curved.

When diffused laser light or converged laser light enters flat glass, since the wave front is not plane, if the flat glass receives the incident light at a predetermined angle, concentric interference fringes occur. At this point, when the wavelength varies, the concentric interference fringes spread outward or shrink inward. When the angle of the flat glass is changed, eccentric interference fringes occur. In this case, interference fringes bend. When the angle of the flat glass is further adjusted, more eccentric interference fringes occur like stripes.

It should be understood by those skilled in the art that various modifications, combinations, sub-combinations and alternations may occur depending on design requirements and other factors insofar as they are within the scope of the appended claims or the equivalents thereof.

What is claimed is:

1. A laser apparatus, comprising:
an optical element which receives at least a part of laser light emitted from a laser generation source and generates interference fringes;
a first two-divided detector having two detectors arranged in the direction of which the interference fringes appear, each of the detectors detecting an amount of light of the interference fringes;
a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;
first calculation means for calculating a first difference signal of detection signals of the two detectors of the first two-divided detector;
second calculation means for calculating a second difference signal of detection signals of the two detectors of the second two-divided detector;
selection means for selecting one of the first difference signal and the second difference signal; and
determination means for detecting a discontinuous variation of a level of one difference signal selected from the first difference signal and the second difference signal.

2. The laser apparatus as set forth in claim 1,
wherein intervals of fringes of the interference fringes between the first two-divided detector and the second two-divided detector are changed by the optical element.

3. The laser apparatus as set forth in claim 1,
wherein the first two-divided detector and the second two-divided detector are disposed on a plane inclined against an optical path of light of the interference fringes.

4. A laser apparatus, comprising:
a diffraction grating which receives laser light from a semiconductor laser, emits first order diffracted light having a predetermined wavelength to the semiconductor laser, and reflects zero-th order light as output light;
an optical element which receives at least a part of the output light of the diffraction grating and generates interference fringes;
a first two-divided detector having two detectors arranged in the direction of which the interference fringes appear, each of the detectors detecting an amount of light of the interference fringes;
a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;
first calculation means for calculating a first difference signal of detection signals of the two detectors of the first two-divided detector;
second calculation means for calculating a second difference signal of detection signals of the two detectors of the second two-divided detector;
selection means for selecting one of the first difference signal and the second difference signal; and
determination means for detecting a discontinuous variation of a level of one difference signal selected from the first difference signal and the second difference signal.

5. The laser apparatus as set forth in claim 4,
wherein intervals of fringes of the interference fringes between the first two-divided detector and the second two-divided detector are changed by the optical element.

6. The laser apparatus as set forth in claim 4,
wherein the first two-divided detector and the second two-divided detector are disposed on a plane inclined against an optical path of light of the interference fringes.

7. A laser apparatus, comprising:
a diffraction grating which receives laser light from a semiconductor laser, emits first order diffracted light having a predetermined wavelength to the semiconductor laser, and reflects zero-th order light;
a mirror which reflects the zero-th order light reflected by the diffraction grating;
support means for supporting the diffraction grating and the mirror while an open angle of the diffraction grating and the mirror is kept constant and for rotatably supporting the diffraction grating and the mirror with a fulcrum which is an intersection of an extended line of a front surface of the diffraction grating and an extended line of a front surface of the mirror;
an optical element which receives at least a part of laser light from the diffraction grating and generates interference fringes;
a first two-divided detector having two detectors arranged in the direction of which the interference fringes appear, each of the detectors detecting an amount of light of the interference fringes;
a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;
first calculation means for calculating a first difference signal of detection signals of the two detectors of the first two-divided detector;
second calculation means for calculating a second difference signal of detection signals of the two detectors of the second two-divided detector;
selection means for selecting one of the first difference signal and the second difference signal; and
determination means for detecting a discontinuous variation of a level of one difference signal selected from the first difference signal and the second difference signal.

8. The laser apparatus as set forth in claim 7,
wherein intervals of fringes of the interference fringes between the first two-divided detector and the second two-divided detector are changed by the optical element.

9. The laser apparatus as set forth in claim 7,
wherein the first two-divided detector and the second two-divided detector are disposed on a plane inclined against an optical path of light of the interference fringes.

10. The laser apparatus as set forth in claim 7, further comprising:

wavelength detection means for detecting the wavelength of transmitted light of the mirror which is a half mirror.

11. A laser apparatus, comprising:

an optical element which receives at least a part of laser light from a laser generation source and generates interference fringes;

a first detector pair having a first detector and a second detector successively arranged with a first distance along the interference fringes;

a second detector pair having the second detector and a third detector successively arranged with a second distance along the interference fringes;

first calculation means for calculating a first difference signal of a detection signal of the first detector and a detection signal of the second detector;

second calculation means for calculating a second difference signal of a detection signal of the second detector and a detection signal of the third detector;

selection means for selecting one of the first difference signal and the second difference signal; and determination means for detecting a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

12. The laser apparatus as set forth in claim 11, wherein intervals of fringes of the interference fringes among the first detector, the second detector, and the third detector are changed by the optical element.

13. The laser apparatus as set forth in claim 11, wherein the first detector, the second detector, and the third detector are disposed on a plane inclined against an optical path of light of the interference fringes.

14. A laser apparatus, comprising:

a diffraction grating which receives laser light from a semiconductor laser, emits first order diffracted light having a predetermined wavelength to the semiconductor laser, and reflects zero-th order light as output light;

an optical element which receives at least a part of the output light of the diffraction grating and generates interference fringes;

a first detector pair having a first detector and a second detector successively arranged with a first distance along the interference fringes;

a second detector pair having the second detector and a third detector successively arranged with a second distance along the interference fringes;

first calculation means for calculating a first difference signal of a detection signal of the first detector and a detection signal of the second detector;

second calculation means for calculating a second difference signal of a detection signal of the second detector and a detection signal of the third detector;

selection means for selecting one of the first difference signal and the second difference signal; and determination means for detecting a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

15. The laser apparatus as set forth in claim 14, wherein intervals of fringes of the interference fringes among the first detector, the second detector, and the third detector are changed by the optical element.

16. The laser apparatus as set forth in claim 14, wherein the first detector, the second detector, and the third detector are disposed on a plane inclined against an optical path of light of the interference fringes.

17. A laser apparatus, comprising:

a diffraction grating which receives laser light from a semiconductor laser, emits first order diffracted light having a predetermined wavelength to the semiconductor laser, and reflects zero-th order light;

a mirror which reflects the zero-th order light reflected by the diffraction grating;

support means for supporting the diffraction grating and the mirror while an open angle of the diffraction grating and the mirror is kept constant and for rotatably supporting the diffraction grating and the mirror with a fulcrum which is an intersection of an extended line of a front surface of the diffraction grating and an extended line of a front surface of the mirror;

an optical element which receives at least a part of laser light from the diffraction grating and generates interference fringes;

a first detector pair having a first detector and a second detector successively arranged with a first distance along the interference fringes;

a second detector pair having the second detector and a third detector successively arranged with a second distance along the interference fringes;

first calculation means for calculating a first difference signal of a detection signal of the first detector and a detection signal of the second detector;

second calculation means for calculating a second difference signal of a detection signal of the second detector and a detection signal of the third detector;

selection means for selecting one of the first difference signal and the second difference signal; and determination means for detecting a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

18. The laser apparatus as set forth in claim 17, wherein intervals of fringes of the interference fringes among the first detector, the second detector, and the third detector are changed by the optical element.

19. The laser apparatus as set forth in claim 17, wherein the first detector, the second detector, and the third detector are disposed on a plane inclined against an optical path of light of the interference fringes.

20. The laser apparatus as set forth in claim 17, further comprising:

wavelength detection means for detecting the wavelength of transmitted light of the mirror which is a half mirror.

21. A laser apparatus, comprising:

an optical element which receives at least a part of laser light emitted from a laser generation source and generates interference fringes;

a first two-divided detector having two detectors arranged in the direction of which the interference fringes appear, each of the detectors detecting an amount of light of the interference fringes;

a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;

a first calculation section which calculates a first difference signal of detection signals of the two detectors of the first two-divided detector;

a second calculation section which calculates a second difference signal of detection signals of the two detectors of the second two-divided detector;

a selection section which selects one of the first difference signal and the second difference signal; and a determination section which detects a discontinuous variation of a level of one difference signal selected from the first difference signal and the second difference signal.

22. A laser apparatus, comprising:

a diffraction grating which receives laser light from a semiconductor laser, emits first order diffracted light having a predetermined wavelength to the semiconductor laser, and reflects zero-th order light as output light;

an optical element which receives at least a part of the output light of the diffraction grating and generates interference fringes;

a first two-divided detector having two detectors arranged in the direction of which the interference fringes appear, each of the detectors detecting an amount of light of the interference fringes;

a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;

a first calculation section which calculates a first difference signal of detection signals of the two detectors of the first two-divided detector;

a second calculation section which calculates a second difference signal of detection signals of the two detectors of the second two-divided detector;

a selection section which selects one of the first difference signal and the second difference signal; and a determination section which detects a discontinuous variation of a level of one difference signal selected from the first difference signal and the second difference signal.

23. A laser apparatus, comprising:

a diffraction grating which receives laser light from a semiconductor laser, emits first order diffracted light having a predetermined wavelength to the semiconductor laser, and reflects zero-th order light;

a mirror which reflects the zero-th order light reflected by the diffraction grating;

a support section which supports the diffraction grating and the mirror while an open angle of the diffraction grating and the mirror is kept constant and for rotatably supporting the diffraction grating and the mirror with a fulcrum which is an intersection of an extended line of a front surface of the diffraction grating and an extended line of a front surface of the mirror;

an optical element which receives at least a part of laser light from the diffraction grating and generates interference fringes;

a first two-divided detector having two detectors arranged in the direction of which the interference fringes appear, each of the detectors detecting an amount of light of the interference fringes;

a second two-divided detector having two detectors arranged in the direction of which the interference fringes appear, each of the detectors detecting an amount of light of the interference fringes, the second two-divided detector being spaced apart from the first two-divided detector for an odd-number multiple of nearly ¼ period of the interference fringes, the second two-divided detector and the first two-divided detector being disposed on a plane perpendicular to an optical path of light of the interference fringes;

a first calculation section which calculates a first difference signal of detection signals of the two detectors of the first two-divided detector;

a second calculation section which calculates a second difference signal of detection signals of the two detectors of the second two-divided detector;

a selection section which selects one of the first difference signal and the second difference signal; and a determination section which detects a discontinuous variation of a level of one difference signal selected from the first difference signal and the second difference signal.

24. A laser apparatus, comprising:

an optical element which receives at least a part of laser light from a laser generation source and generates interference fringes;

a first detector pair having a first detector and a second detector successively arranged with a first distance along the interference fringes;

a second detector pair having the second detector and a third detector successively arranged with a second distance along the interference fringes;

a first calculation section which calculates a first difference signal of a detection signal of the first detector and a detection signal of the second detector;

a second calculation section which calculates a second difference signal of a detection signal of the second detector and a detection signal of the third detector;

a selection section which selects one of the first difference signal and the second difference signal; and a determination section which detects a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

25. A laser apparatus, comprising:

a diffraction grating which receives laser light from a semiconductor laser, emits first order diffracted light having a predetermined wavelength to the semiconductor laser, and reflects zero-th order light as output light;

an optical element which receives at least a part of the output light of the diffraction grating and generates interference fringes;

a first detector pair having a first detector and a second detector successively arranged with a first distance along the interference fringes;

a second detector pair having the second detector and a third detector successively arranged with a second distance along the interference fringes;

a first calculation section which calculates a first difference signal of a detection signal of the first detector and a detection signal of the second detector;

a second calculation section which calculates a second difference signal of a detection signal of the second detector and a detection signal of the third detector;

a selection section which selects one of the first difference signal and the second difference signal; and a determination section which detects a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

26. A laser apparatus, comprising:

a diffraction grating which receives laser light from a semiconductor laser, emits first order diffracted light having a predetermined wavelength to the semiconductor laser, and reflects zero-th order light;

a mirror which reflects the zero-th order light reflected by the diffraction grating;

a support section which supports the diffraction grating and the mirror while an open angle of the diffraction grating and the mirror is kept constant and for rotatably supporting the diffraction grating and the mirror with a fulcrum which is an intersection of an extended line of a front surface of the diffraction grating and an extended line of a front surface of the mirror;

an optical element which receives at least a part of laser light from the diffraction grating and generates interference fringes;

a first detector pair having a first detector and a second detector successively arranged with a first distance along the interference fringes;

a second detector pair having the second detector and a third detector successively arranged with a second distance along the interference fringes;

a first calculation section which calculates a first difference signal of a detection signal of the first detector and a detection signal of the second detector;

a second calculation section which calculates a second difference signal of a detection signal of the second detector and a detection signal of the third detector;

a selection section which selects one of the first difference signal and the second difference signal; and a determination section which detects a discontinuous variation of a level of one difference signal selected from the first difference signal and the second difference signal, wherein the first distance and the second distance on a plane perpendicular to an optical path of light of the interference fringes against one period $2\pi$ are nearly $(2\pi/3, \pi/3)$ or nearly $(2\pi/3, 2\pi/3)$.

* * * * *